US012623171B1

(12) United States Patent
Khan et al.

(10) Patent No.: US 12,623,171 B1
(45) Date of Patent: May 12, 2026

(54) METHOD OF CLEANING A FOULED REVERSE OSMOSIS MEMBRANE

(71) Applicant: King Fahd University of Petroleum and Minerals, Dhahran (SA)

(72) Inventors: Majad Khan, Dhahran (SA); Asif Matin, Dhahran (SA); Nadeem Baig, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 19/396,547

(22) Filed: Nov. 21, 2025

(51) Int. Cl.
 *B01D 41/00* (2006.01)
 *B01D 61/10* (2006.01)

(52) U.S. Cl.
 CPC ............. *B01D 41/00* (2013.01); *B01D 61/10* (2013.01); *B01D 2321/164* (2013.01)

(58) Field of Classification Search
 None
 See application file for complete search history.

(56) References Cited

U.S. PATENT DOCUMENTS

| | | | | |
|---|---|---|---|---|
| 11,491,445 | B2 * | 11/2022 | Gojo | ...................... B01D 65/02 |
| 11,904,288 | B1 * | 2/2024 | Dihora | ..................... B01J 13/14 |
| 2012/0009481 | A1 | 1/2012 | Song et al. | |
| 2020/0216619 | A1 | 7/2020 | Liu et al. | |

FOREIGN PATENT DOCUMENTS

| | | |
|---|---|---|
| CN | 109513015 B | 6/2021 |
| CN | 114204112 A | 3/2022 |

OTHER PUBLICATIONS

Qiaoxin Wu, et al., "A new gelcasting using Isobam both as dispersant and monomer", Ceramics International, vol. 49, Issue 10, May 15, 2023 (available online Jan. 19, 2023), p. 15560-15567 (4 pages; excerpts only).

Xiao Wu, et al., "Grafting PEG and alkyl comb polymers onto bleached wood pulp fibres", The Canadian Journal of Chemical Engineering, vol. 101, Issue 9, Sep. 2023 (first published Jan. 24, 2023), pp. 4914-4926.

* cited by examiner

*Primary Examiner* — Krishnan S Menon
(74) *Attorney, Agent, or Firm* — Oblon, McClelland, Maier & Neustadt, L.L.P.

(57) ABSTRACT

A method of cleaning a fouled reverse osmosis (RO) membrane using a comb-shaped polymer which includes dissolving the comb-shaped polymer and a base in water to form a solution, contacting the fouled RO membrane with the solution to produce a cleaned RO membrane. The comb-shaped polymer includes reacted units of poly(isobutylene-alt-maleic anhydride) and an oligoethylene amine where, the oligoethylene amine is triethylenetetramine, tetraethylene pentaamine, or pentaethylenehexamine.

19 Claims, 24 Drawing Sheets

50

Mix a poly(isobutylene-alt-maleic anhydride) (PIMA) and a first organic solvent to form a solution — 52

Mix an oligoethylene amine and a second organic solvent to form a mixture — 54

Add the solution to the mixture and stir to form the comb-shaped polymer — 56

50

Mix a poly(isobutylene-alt-maleic anhydride) (PIMA) and a first organic solvent to form a solution — 52

↓

Mix an oligoethylene amine and a second organic solvent to form a mixture — 54

↓

Add the solution to the mixture and stir to form the comb-shaped polymer — 56

| Polymer Product | Degree of Conjugation |
|---|---|
| PIMA-TETA | 95% |
| PIMA-TEPA | 92% |
| PIMA-PEHA | 92% |

FIG. 5B

Pristine

DI Flush

TETA

PEHA

PEHA

METHOD OF CLEANING A FOULED REVERSE OSMOSIS MEMBRANE

BACKGROUND

Technical Field

The present disclosure is directed to a method of cleaning a fouled reverse osmosis (RO) membrane using a polymer, more preferably, with a comb-shaped polymer including poly(isobutylene-alt-maleic anhydride) and an oligoethylene amine groups.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present disclosure.

Membrane-based technologies are gaining wide acceptance in water and wastewater treatment, with RO emerging as the dominant method for seawater desalination and wastewater reclamation. Nonetheless, membrane fouling caused by natural organic matter remains an important challenge, as it leads to decreased permeability, increased solute leakage, and consequently higher operational and maintenance costs.

Conventional cleaning relies on harsh chemical agents such as acids, alkalis, and surfactants, which act via hydrolysis, solubilization, and chelation. Despite restoring performance, such practices damage the active layer of membranes and generate environmentally hazardous waste streams. Moreover, existing cleaning agents often fail to completely remove hydrophobic foulants, resulting in incomplete recovery.

Recent research has explored eco-friendly alternatives. For instance, Tian et al. (2022) [Tian, C., et al. Environ. Sci. Technol, 56 (2022), 12563] used a green solvent, methyl-5-(dimethylamino)-2-methyl-5-oxopentanoate (MDMO), achieving nearly 100% flux recovery in PVDF membranes, while Xiao et al. (2024) [Xiao, H., et al. J. Hazard Mater. 462, (2024) 132827] demonstrated a PMS/Cl⁻ cleaning system restoring 94% flux in humic acid-fouled ultrafiltration membranes. These studies highlight the potential of green cleaning but were mostly conducted on ultrafiltration membranes including polyethersulfone (PES) and polyvinylidene fluoride (PVDF), leaving their compatibility with PA-based RO membranes uncertain. Thus, despite progress, eco-friendly cleaning agents need further investigation for RO membranes, particularly regarding their chemical compatibility, operational feasibility, and performance under practical conditions such as pH and temperature variations.

Accordingly, it is one object of the present disclosure to provide a method of developing a polymer-based material for water treatment applications that may overcome the limitations of existing membranes, including fouling, reduced performance after cleaning, and environmental concerns associated with conventional chemical treatments.

SUMMARY

In an exemplary embodiment, a method of cleaning a fouled reverse osmosis (RO) membrane using a comb-shaped polymer is described. The method includes dissolving the comb-shaped polymer and a base in water to form a solution, contacting the fouled RO membrane with the solution to produce a cleaned RO membrane. The comb-shaped polymer includes reacted units of poly(isobutylene-alt-maleic anhydride) and an oligoethylene amine where, the oligoethylene amine is one or more selected from the group consisting of triethylenetetramine, tetraethylene pentaamine, and pentaethylenehexamine.

In some embodiments, the concentration of the comb-shaped polymer in the solution is 2-3 $gL^{-1}$.

In some embodiments, the pH of the solution is 9-12.

In some embodiments, the solution is contacted with the fouled RO membrane for 40-60 hours.

In some embodiments, the solution is contacted with the fouled RO membrane at a temperature of 30-50° C.

In some embodiments, the cleaned RO membrane has a flux recovery of 55-95% compared to the fouled RO membrane before the contacting.

In some embodiments, the cleaned RO membrane has a $Ca^{2+}$ presence of less than 2 wt. %.

In some embodiments, the cleaned RO membrane has a carbon to oxygen ratio of 1.5-5 to 1.

In some embodiments, the cleaned RO has a sulfur content of 3-10 wt. %.

In some embodiments, the cleaned RO membrane has an isoelectric point of 3-4.

In some embodiments, the RO membrane is a ceramic membrane.

In another exemplary embodiment, a method of synthesizing a comb-shaped polymer is described. The method includes mixing poly(isobutylene-alt-maleic anhydride) (PIMA) and a first organic solvent to form a solution, mixing an oligoethylene amine and a second organic solvent to form a mixture. The method further includes adding the solution to the mixture and stirring to form the comb-shaped polymer. The oligoethylene amine is one or more selected from the group consisting of triethylenetetramine, tetraethylene pentaamine, and pentaethylenehexamine.

In some embodiments, the first organic solvent is dimethyl sulfoxide.

In some embodiments, the second organic solvent is dimethyl sulfoxide.

In some embodiments, the solution and the mixture are stirred at a temperature of 40-80° C.

In some embodiments, the solution and the mixture are stirred for 60-90 hours.

In some embodiments, the molar ratio of the oligoethylene amine to the PIMA is 18-22 to 1.

In some embodiments, the degree of pendent oligoethylene amine conjugation is 90-100%.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIG. 5B shows degree of pendant oligoethyleneamine conjugation in product polymers.

DETAILED DESCRIPTION

Figures 1, 2:
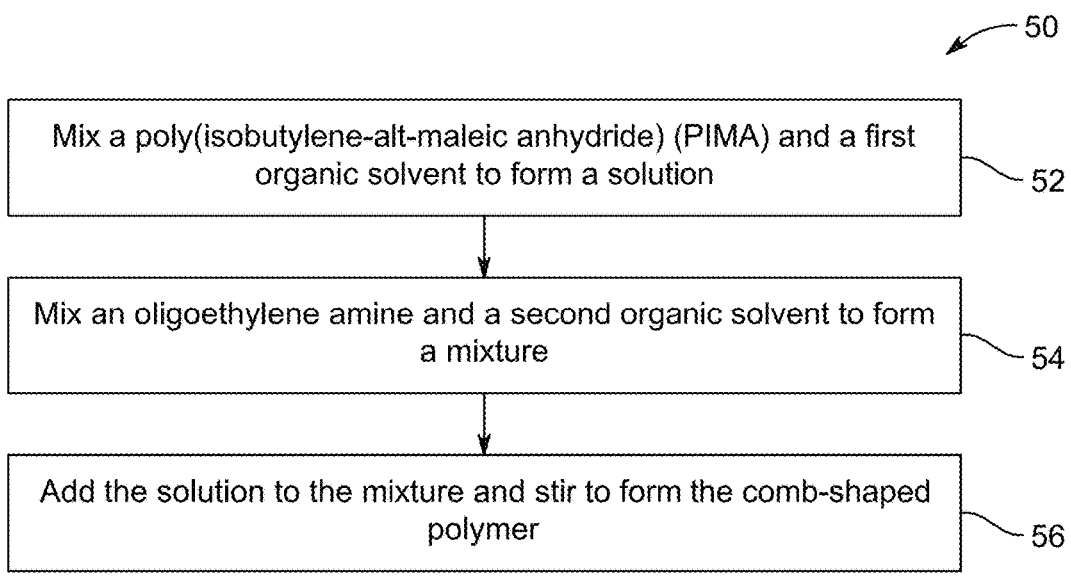
FIG. 1 is an exemplary flowchart illustrating the synthesis of a comb-shaped polymer, according to certain embodiments.
FIG. 2 shows a schematic reaction pathway for synthesis of the comb shaped amphiphilic polymers, according to certain embodiments.

In the drawings, like reference numerals designate identical or corresponding parts throughout the several views. Further, as used herein, the words "a", "an", and the like generally carry a meaning of "one or more", unless stated otherwise.

Furthermore, the terms "approximately," "approximate", "about," and similar terms generally refer to ranges that include the identified value within a margin of 20%, 10%, or preferably 5%, and any values therebetween.

In this application, a numerical value interval (i.e., a numerical value range) is involved, and, if not specifically stated, an optional numerical value distribution is considered continuous within the numerical value interval, and includes two numerical value endpoints (i.e., minimum and maximum values) of the numerical value range, and each numerical value between the two numerical value endpoint.

As used herein, the term "room temperature" refers to a temperature range of '25 degrees Celsius (° C.)±3° C. in the present disclosure.

As used herein, the term "amount" refers to the proportion or presence of a particular substance, component, or element within a larger system. It can be quantified in various ways, such as percentage, concentration, or mass. The content of an element refers to its proportion or concentration within a given material, mixture, or compound. It can be expressed in various units such as atomic percent (at. %), weight percent (wt. %), or mole fraction.

A wt. % of a component, unless specifically stated to the contrary, is based on the total weight of the formulation or composition in which the component is included. For example, if a particular element or component in a composition or article is said to have 5 wt. %, it is understood that this percentage is in relation to a total compositional percentage of 100%.

The present disclosure is intended to include all hydration states of a given compound or formula, unless otherwise noted or when heating a material.

In addition, the present disclosure is intended to include all isotopes of atoms occurring in the present compounds and complexes. Isotopes include those atoms having the same atomic number but different mass numbers. By way of general example, and without limitation, isotopes of hydrogen include deuterium and tritium, and isotopes of carbon include $^{13}C$ and $^{14}C$. Isotopes of oxygen include $^{16}O$, $^{17}O$, and $^{18}O$ and isotopes of nitrogen include $^{14}N$ and $^{15}N$. Isotopically-labeled compounds of the disclosure may generally be prepared by conventional techniques known to those skilled in the art or by processes analogous to those described herein, using an appropriate isotopically-labeled reagent in place of the non-labeled reagent otherwise employed.

As used herein, the term "surface roughness" refers to the measure of the texture or irregularities present on a surface, typically quantified by the deviations in the surface profile from an ideal smooth plane. Surface roughness influences various surface properties, including wettability, adhesion, friction, and optical characteristics. Surface roughness is commonly expressed using parameters such as $R_a$ (arithmetical mean roughness), or $R_z$ (average maximum height). The controlled roughness can enhance or reduce interactions with liquids, particles, or biological entities.

As used herein, the term "fouled reverse osmosis membranes" refers to membranes whose performance has been impaired due to the accumulation of organic, inorganic, biological, or colloidal matter on their surface or within their pores, resulting in reduced water permeability and increased solute passage.

As used herein, the term "wettability of a membrane" refers to the ability of a liquid, typically water, to maintain contact with the surface of the membrane. Wettability is an important parameter that influences fluid transport, separation efficiency, and surface interactions in membrane-based systems. It is commonly evaluated by measuring the water contact angle on the membrane surface.

As used herein, the term "water contact angle" refers to the angle formed at the interface between a water droplet and a solid surface, measured through the liquid at the point where the liquid, solid, and vapor phases meet. It is an indicator of the wettability of the surface: a low contact angle (typically <90°) signifies high wettability or hydrophilicity, whereas a high contact angle (typically >90°) indicates low wettability or hydrophobicity. Surfaces exhibiting contact angles greater than 1500 are generally referred to as superhydrophobic.

As used herein, the term "flux recovery" of the membranes refers to the extent to which the water permeability (or flux) of a fouled membrane is restored after a cleaning process, typically expressed as a percentage of the original flux.

Aspects of this disclosure are directed to a method of cleaning fouled reverse osmosis (RO) membranes using environmentally friendly polymers. More preferably, the method employs comb-shaped polymers including a poly (isobutylene-alt-maleic anhydride) backbone with oligoethylene amine groups. These polymers are designed to remove organic foulants effectively under mild conditions, restoring membrane performance and surface properties. The present disclosure provides a sustainable and eco-friendly alternative to conventional chemical cleaning agents, with potential applications in seawater desalination and wastewater management.

According to first aspect of the present disclosure, a method of cleaning a fouled RO membrane is described. The method includes dissolving a comb-shaped polymer and a base in water to form a solution. The method further includes contacting the fouled RO membrane with the solution to produce a cleaned RO membrane. In some embodiments, the RO membrane is made up of material including but not limited to, polyamide, polysulfone (PSf), polyvinylidene fluoride (PVDF), polyethersulfone (PES), polypropylene (PP), polyethylene (PE), ceramic, cellulose acetate (CA), polyimide (PI) and polytetrafluoroethylene (PTFE). In a preferred embodiment, the RO membrane is a ceramic membrane.

In some embodiments, the RO membrane has a permeate flow rate of 8700-9500 m³/d, preferably 8800-9400 m³/d, preferably 8900-9300 m³/d and preferably 8950-9250 m³/d. In a preferred embodiment, the RO membrane has the permeate flow rate of 9000 m³/d with the pH value of the RO membrane ranging from 2-11.

In some embodiments, the stabilized salt rejection value of the RO membrane ranges from 98-99.99%, preferably 98.20-99.95%, preferably 98.40-99.90% and preferably 98.60-99.89%, a boron rejection ranging from 90-95%, preferably 90.5-94.5%, preferably 91-94%, preferably 91.5-93.5% and preferably 92-93%. In a preferred embodiment, the RO membrane has the salt rejection value of 99.88% with the boron rejection of 93%.

In some embodiments, the method includes cleaning the fouled RO membrane with polymers including polyacrylic acid, sodium polyacrylate, polyacrylamide, polyethylene glycol (PEG), polyvinylpyrrolidone (PVP), poloxamers, enzyme-based polymer formulations, and polyethylene-imine (PEI). In a preferred embodiment, the method includes cleaning the fouled RO with a comb-shaped polymer including reacted units of poly (isobutylene-alt-maleic anhydride) and an oligoethylene amine, where the oligoethylene amine is one or more selected from the group consisting of triethylenetetramine (TETA), tetraethylene pentaamine (TEPA), and pentaethylenehexamine (PEHA). In a preferred embodiment, the oligoethylene amine is PEHA.

In some embodiments, the concentration of the comb-shaped polymer in the solution ranges from 2-3 $gL^{-1}$, preferably 2.1-2.9 $gL^{-1}$, preferably 2.2-2.8 $gL^{-1}$, preferably 2.3-2.7 $gL^{-1}$ and preferably 2.4-2.6 $gL^{-1}$. In a preferred embodiment, the concentration of comb-shaped polymer including TEPA oligoethylene amine is 2.5 g/L.

In some embodiments, the pH of the solution ranges from 9-12, preferably 9.2-11.9, preferably 9.4-11.8, preferably 9.6-11.7 and preferably 10-11.6 by adding the base selected from group consisting of sodium hydroxide (NaOH), potassium hydroxide (KOH), lithium hydroxide (LiOH) and aqueous ammonia ($NH_3$). In a preferred embodiment, the sodium hydroxide (NaOH) is used as the base for maintaining the pH of the solution at 11.5. The water may include, but is not limited to, tap water, distilled water, bi-distilled water, deionized water, deionized distilled water, reverse osmosis water, and/or some other water. In other embodiments, the pH of the solution including PEHA solution used for cleaning the fouled RO membrane ranges from 8-10, preferably 8.2-9.9, preferably 8.4-9.8 and preferably 8.5-9.5. In a preferred embodiment, the pH of the solution used for cleaning the fouled RO membrane is 9.5.

In some embodiments, the cleaned RO membrane has an isoelectric point of 3-4, preferably 3.2-3.9, preferably 3.3-3.8, preferably 3.4-3.7 and preferably 3.5-3.6. Maintaining the isoelectric point during cleaning reduces foulant-membrane interactions, aiding in effective foulant removal and recovery of membrane performance.

In some embodiments, during cleaning the solution is contacted with the fouled RO membrane for 40-60 hours (h) at a temperature of 30-50° C. In some embodiments, the solution is contacted with the fouled RO membrane for 40-60 h, preferably 40.5-59.5 h, preferably 41-58 h, preferably 41.5-56 h, preferably 42-55 h, preferably 42.5-54 h, preferably 43-53 h, preferably 43.5-52 h, preferably 44-51 h, preferably 44.5-50 h and preferably 45-49 h. In a preferred embodiment, the solution is contacted with the fouled RO membrane for 48 h.

In some embodiments, the solution temperature during contact with the fouled RO membrane is maintained within the range of 30-50° C., preferably 30.5-49.5° C., preferably 31-49° C., preferably 31.5-48.5° C., preferably 32-48° C., preferably 33-47° C., preferably 34-46° C., preferably 35-45° C., preferably 36-44° C., preferably 37-43° C., preferably 38-42° C. and preferably 39-41° C. In some embodiments, the solution is heated by methods including water bath, oil bath, heating mantle, hot plate, microwave irradiation and jacketed vessel circulation. In a preferred embodiment, the solution is heated up to 40° C. using a hot plate.

In the present disclosure term "flux recovery" of the membrane indicates how well a membrane regains its original water permeability after cleaning. Expressed as a percentage of the initial flux, it reflects cleaning efficiency high values indicate effective foulant removal, while low values indicate irreversible fouling or insufficient cleaning. In some embodiments, the cleaned RO membrane has a flux recovery of 55-95%, preferably 60-90%, preferably 65-85%, preferably 70-80%, preferably 72-78%, preferably 74-76% and preferably 75-76% compared to the fouled RO membrane before the contacting. In a preferred embodiment, the flux recovery of the cleaned RO membrane is ~95%.

In some embodiments, the cleaned RO membrane shows water contact angle value of 40°-55°, preferably 41°-54°, preferably 41.5°-53°, preferably 42°-52°, preferably 43°-51°, preferably 44°-50° and preferably 45°-49°. In a preferred embodiment, the cleaned RO shows water contact angle of 48°.

In some embodiments, the cleaned RO membrane may still contain traces of various ions such as $Na^+$, $K^+$, $Mg^{2+}$, $Cl^-$, $SO_4^{2-}$, or $HCO_3^-$ depending on the feedwater composition and the effectiveness of the cleaning process. These residual species can originate from dissolved salts, scaling deposits, or incomplete rinsing after chemical treatment. In some embodiments, the cleaned RO membrane has a $Ca^{2+}$ presence of less than 2 wt. %, preferably less than 1.9 wt. %, preferably less than 1.8 wt. %, preferably less than 1.7 wt. %, preferably less than 1.6 wt. %, preferably less than 1.5 wt. %, preferably less than 1.4 wt. %, preferably less than 1.3 wt. %, and preferably less than 1.2 wt. %. In a preferred embodiment, the cleaned RO membrane has $Ca^{2+}$ presence of less than 1.1 wt. %.

In some embodiments, the cleaned RO membrane has a carbon to oxygen ratio of 1.5-5:1, preferably 1.6-4.9:1, preferably 1.7-4.8:1, preferably 1.8-4.7:1, preferably 1.9-4.6:1, preferably 2-4.5:1, preferably 2.1-4.4:1, preferably 2.2-4.3, preferably 2.3-4.2:1, and preferably 2.4-4.1:1. In a preferred embodiment, the cleaned RO membrane has a carbon to oxygen ratio of ~4:1. In other embodiments, the cleaned RO membrane has a sulfur content of 3-10 wt. %, preferably 3.5-9.5 wt. %, preferably 4-9 wt. %, preferably 4.5-8.5 wt. %, preferably 5-8 wt. %, preferably 6-7.8 wt. %, preferably 6.5-7.5 wt. %. In a preferred embodiment, the cleaned RO membrane has sulfur content of 7.4 wt. %.

FIG. 1A shows a method of synthesizing the comb-shaped polymer. The order in which the method 50 is described is not intended to be construed as a limitation, and any number of the described method steps can be combined in any order to implement the method 50. Additionally, individual steps may be removed or skipped from the method 50 without departing from the spirit and scope of the present disclosure.

At step 52, the method 50 includes mixing poly (isobutylene-alt-maleic anhydride) (PIMA) and a first organic solvent to form a solution.

In some embodiments, the first organic solvent may include, but is not limited to, methanol, ethanol, acetic acid, formic acid, propionic acid, tetrahydrofuran, ethyl acetate, dimethylformamide, acetonitrile, acetone, dichloromethane, toluene, nitromethane, propylene carbonate, dimethyl sulfoxide, and glycerol. The water may include, but is not limited to, tap water, distilled water, bi-distilled water, deionized water, deionized distilled water, reverse osmosis water, and/or some other water. In a preferred embodiment, the first organic solvent is dimethyl sulfoxide (DMSO) and the method includes mixing the PIMA in DMSO where, the mixing can be done by various methods including stirring, shaking, vortexing, sonication, heating with stirring. In a preferred embodiment, the PIMA and DMSO are mixed by stirring.

In some embodiments, the concentration of PIMA ranges from 15-25 g/L, preferably 16-24 g/L, preferably 16.5-23.5 g/L, preferably 17-23 g/L, preferably 17.5-22.5 g/L, preferably 18-22 g/L, preferably 18.5-21.5 g/L and preferably 19-21 g/L. In a preferred embodiment, the concentration of PIMA is 20 g/L.

At step 54, the method 50 includes mixing an oligoethylene amine and a second organic solvent to form a mixture.

In some embodiments, the oligoethylene amine is selected from ethylenediamine, diethylenetriamine, triethylenetetramine, tetraethylenepentamine, pentaethylenehexamine, hexaethyleneheptamine, heptaethyleneoctamine, and higher homologues, as well as their substituted derivatives. In a preferred embodiment the oligoethylene amine is one or more selected from the group consisting of triethylenetetramine, tetraethylene pentaamine, and pentaethylenehexamine.

In some embodiments, the second organic solvent includes methanol, ethanol, acetic acid, formic acid, propionic acid, dimethylformamide, dimethyl sulfoxide, tetrahydrofuran, ethyl acetate, acetonitrile, acetone, dichloromethane, toluene, nitromethane, propylene carbonate, and glycerol. In a preferred embodiment, the second organic solvent is DMSO.

At step 56, the method 50 includes adding the PIMA and the first organic solvent solution (also referred as solution) to the oligoethylene amine and a second organic solvent mixture (also referred as mixture) followed by stirring to form the comb-shaped polymer.

In some embodiments, the molar ratio of the oligoethylene amine to the PIMA is 18-22:1, preferably 18.5-21.5:1, preferably 18.7-21.3:1, preferably 19-21:1, preferably 19.2-20.5:1, preferably 19.4-20.4:1, preferably 19.6-20.2:1 and preferably 19.8-20.1:1. In a preferred embodiment, the molar ratio of the oligoethylene amine to the PIMA is 20:1.

In some embodiments, the PIMA and the first organic solvent solution is added to oligoethylene amine and a second organic solvent mixture by methods including dropwise addition, syringe injection, pipetting, slow continuous pumping, or direct pouring under controlled stirring. In some embodiments, the solution and the mixture are stirred at a temperature of 40-80° C., preferably 45-75° C., preferably 50-70° C., preferably 52-68° C., preferably 54-64° C., preferably 55-63° C., preferably 56-62° C. and preferably 57-61° C. In other embodiments, the solution and the mixture are stirred for 60-90 hours (h), preferably 65-85 h, preferably 68-80 h, preferably 69-79 h, preferably 70-75 h and preferably 71-73 h. In a preferred embodiment, the method includes adding the solution into the mixture by stirring for 72 h and the temperature is maintained at 60° C.

In some embodiments, the degree of pendent oligoethylene amine conjugation is 90-100%. As used herein the term "degree of pendent oligoethylene amine conjugation" refers to the extent to which reactive sites on a polymer backbone are functionalized with oligoethylene amine chains. This parameter directly influences the polymer's interaction with foulants on the membrane surface. More conjugation provides more amine groups that can engage in hydrogen bonding, electrostatic interactions, or mild chelation with organic deposits, biofilms, and scale-forming ions, thereby enhancing the polymer's ability to disrupt and remove fouling layers. In some embodiments, the degree of pendent oligoethylene amine conjugation ranges from 90-100%, preferably 90.5-99.5%, preferably 91-99%, preferably 91.2-98%, preferably 91.4-97%, preferably 91.6-96%, preferably 91.8-95% and preferably 91.9-94%. In a preferred embodiment, the degree of pendent oligoethylene amine conjugation is 92%.

In some embodiments, the foulant is natural organic matter (NOM) which includes but is not limited to humic acids, derivatives of humic acid, humic substances, polysaccharides, proteins, amino sugars, polyhydroxy-aromatics, carbohydrates, carboxylic acids, amino acids, hydrocarbons, hydrophilic compounds, hydrophobic compounds, terrestrial and vegetative debris and algae. In a preferred embodiment, the foulant is one or more polysaccharides.

The following examples are provided solely for illustration and are not to be construed as limitations of the present disclosure, as many variations thereof are possible without departing from the spirit and scope of the present disclosure.

EXAMPLES

The following examples demonstrate a method of cleaning a fouled reverse osmosis membrane by a comb-shaped polymer including poly (isobutylene-alt-maleic anhydride) and an oligoethylene amine groups. The examples are provided solely for illustration and are not to be construed as limitations of the present disclosure, as many variations thereof are possible without departing from the spirit and scope of the present disclosure.

Example 1: Materials

Sodium alginate (95% purity Sigma Aldrich, Inc.) of high purity was used as the model foulant. Poly(isobutylene-alt-maleic anhydride) [PIMA], organic amines (pentaethylene hexamine [PEHA], tetraethylene pentaamine [TEPA], triethyl tetraamine [TETA]), and dimethyl sulfoxide (DMSO) of reagent grade purity (Sigma Aldrich, Inc.) were used as received for the polymer synthesis. For the dialysis, HCl and NaOH of high purity were employed.

Commercial SWRO membranes from a local desalination plant in Jubail, Saudi Arabia were used for the experiments (Table 1). These are seawater RO membranes manufactured by LG with a salt rejection rate of approximately 100%. The Boron rejection was also quite high (>90%). These membranes had a permeate flux of ~40 LMH at a pressure of 20 bars and a feed temperature of 25° C.

TABLE 1

| Membrane specifications provided by the supplier | |
| --- | --- |
| Specification | LG SW 400 R G2 |
| Permeate Flow Rate (GPD) (m³/d) | 9,000 (34.1) |
| Stabilized Salt Rejection (%) | 99.88 |
| Boron Rejection (%) | 93 |
| Feed Spacer Thickness (mil) | 34 |
| Max. Applied Pressure (psi/bar) | 1,200/82.7 |
| Max. Operating Temp. (° C./° F.) | 45/113 |
| pH range | 2-11 |

Example 2: Synthesis of Cleaning Chemicals

For the synthesis of the target polymer, a method similar to that described by Khan et al. [Khan, et al., Macromol Rapid Commun 31, (2010) 1142, which is incorporated herein by reference in its entirety] was adapted. The synthesis began with the combination of 100 mL of dimethyl sulfoxide (DMSO) and 2 g of poly (isobutylene-alt-maleic anhydride) [PIMA] at room temperature. Meticulous stirring was employed to ensure complete dissolution of the polymer. In a separate flask, a solution was prepared by combining twenty-fold excess of the ethylene amine-based compound with 150 mL of DMSO. The polymer solution was gradually introduced into this flask while maintaining a temperature of 60° C., and the mixture was stirred for 72 hours.

After the reaction had completed, the reaction mixture was cooled to 30° C. and the crude product was precipitated into in acetone (2 L). Following dissolution in water, a 2-day dialysis process was employed using a membrane dialysis method with a tubing of 14 kDa molecular weight cutoff (MWCO). The pH was carefully adjusted to the range of 4-6 by adding concentrated hydrochloric acid (HCl). The purification process concluded with an additional day of re-dialysis against water via the addition of sodium hydroxide (NaOH), ultimately yielding the target polymer through freeze-drying.

Example 3: Characterization

The product polymer was subjected to comprehensive characterization to affirm the successful synthesis. Fourier transform infrared spectroscopy (FTIR) was employed to analyze pivotal regions, including N—H, C—H, (C=O) OH—, and (C=O)NH—. The FT-IR spectra were recorded using a Nicolet iS10 spectrometer. Additionally, nuclear magnetic resonance (NMR) spectroscopy was utilized for polymer characterization. $^1$H NMR spectra were obtained with JEOL 600 MHz spectrometer at operational frequencies of 600.00 MHz, using the signal of HOD protons at δ 4.63 as internal standards.

Example 4: Membrane Fouling and Cleaning

Prior to the fouling and cleaning experiments in the cross-flow mode, soak cleaning tests were carried out to assess the potential of the synthesized polymers for membrane cleaning. For this purpose, heavily fouled and age-hardened membranes from a local RO plant (Jubail, Saudi Arabia) were used. Flat sheet coupons of approx. dimensions 10 cm×5 cm were cut and placed in ~700 mL of the cleaning solutions for 48 h. Tetraethylene pentaamine (TEPA) was selected for this phase and a 2.5 g/L solution was prepared. As a control, a second beaker containing only NaOH was used. The pH and temperature of both solutions were maintained at 11.5 and 40° C. respectively. The solutions were stirred using magnetic stirring bars at a moderate speed to ensure maximum contact with the membranes.

Figure 3:
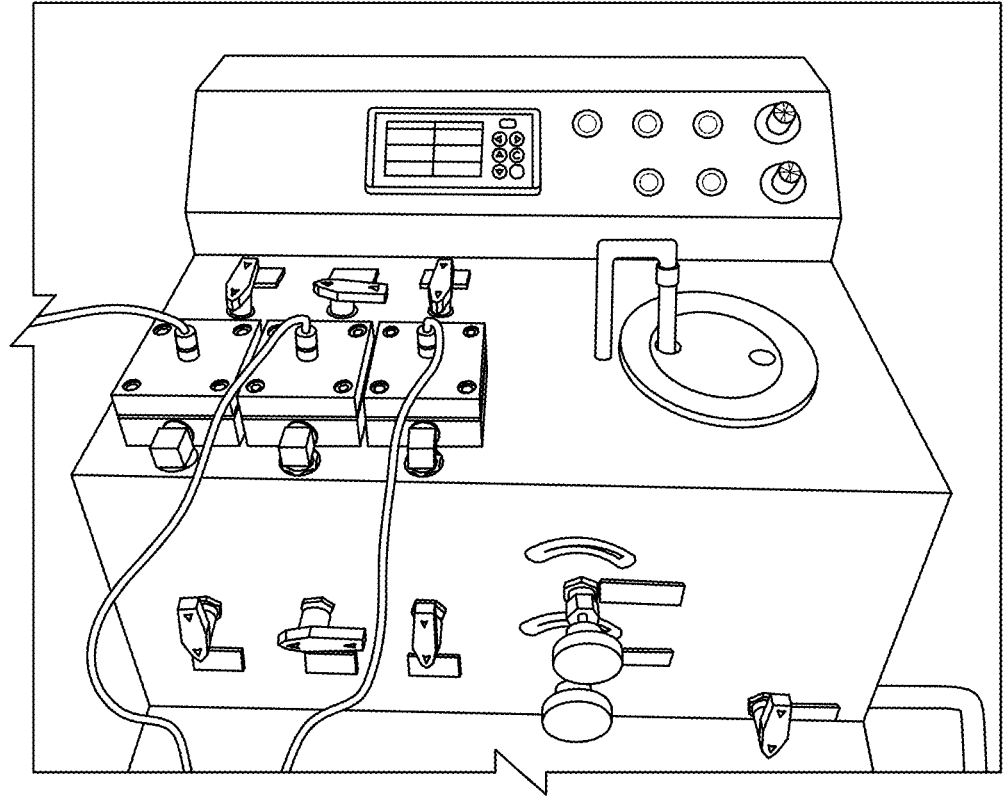
FIG. 3 shows a bench-top cross-flow membrane filtration setup, according to certain embodiments.

The fouling experiments were carried out in a bench-top cross-flow filtration setup (FIG. 3). This consisted of a cylindrical-shaped feed reservoir with ~1 L capacity with the concentrate recycled back into the reservoir. The system was pressurized with the help of two pumps, an auxiliary pump, and a high-pressure pump. Three membrane cells made of stainless steel were placed in parallel to each other with the feed distributed equally between them. A thin permeate tube of teflon was connected to the top portion of each cell. Membranes of circular shape and approx. diameter 3.5 cm were used for this study.

Prior to fouling, the membranes were compacted at 20 bars for 2-3 h with distilled (DI) water and a feed temperature of ~25° C.° C. The stabilized permeate flux was determined for all the cells. 100 mg of CaCl₂) dissolved separately in 100 mL of DI water was added to the feed and the system was equilibrated. Thereafter, 200 mL of 100 ppm sodium alginate solution prepared earlier was added to the feed and the fouling run began.

The fouled membranes were cleaned using the same cross-flow setup. A standard cleaning protocol was followed, and the cleaning commenced immediately after the fouling runs: the cells were flushed with DI water at intermediate cross-flow velocities (~15 Uh) for approx. 1 h. Then, a specific cleaning solution was circulated through one of the cells whilst the others were closed. The cleaning solution was first heated to the desired temperature, e.g., 40° C. on a hot plate, and the temperature of the recirculating chiller was set to ~45° C. The cleaning solution was circulated through the cell for 2 h at a pump speed of ~20. This speed indicates that the pump was working at 50% of its full working capacity. After this, the cell was flushed with DI water for 15 minutes to remove any excess cleaning agent that may have deposited on the membrane surface.

Example 5: Post Cleaning Characterization

Contact angle measurement was employed to assess changes in membrane hydrophilicity and wetting properties, providing evidence of fouling, post-cleaning. Measurements were conducted using a Kruss goniometer DSA25 (Kruss GmbH, Germany). For this test, samples were cut into small rectangular shapes and positioned on a glass slide. A syringe tip is then carefully placed near the sample surface to dispense a liquid drop (e.g., distilled water) of approximately 2 µL onto it. Images of the drop are captured by a camera, and specialized software determines the contact angles. The cleaning efficiency of the chemicals can be assessed by comparing the contact angles of cleaned membranes to those of pristine membranes.

Scanning electron microscopy (SEM) coupled with energy-dispersive X-ray spectroscopy (EDX) analysis was performed using a JEOL JSM-6610LV Scanning Electron Microscope (JEOL Ltd., Japan). This SEM is equipped with an Oxford Instruments X-Max$^N$ 50 EDX detector for elemental analysis. Samples were prepared following standard procedures to ensure compatibility with SEM/EDX analysis. Initially, the samples were affixed onto aluminum stubs using double-sided carbon adhesive tape. Non-conductive samples underwent sputter-coating with a thin layer of gold using a Quorum Q150T ES sputter coater. This process enhances surface conductivity and minimizes charging effects during imaging. The entire sample surface was scanned, and images at varying magnifications were captured. The effect of the chemicals on the fouled membrane was studied by comparing the surface morphologies of pristine and treated membranes.

Atomic Force Microscopy (AFM) analysis was conducted using a Nanosurf Flex AFM 5 (Nanosurf AG, Switzerland) equipped with an Isostage System and C3000 Controller. Samples were prepared and mounted onto a substrate using standard procedures. The AFM probe scanned the sample surface to produce high-resolution images illustrating surface topography and morphology. AFM provides valuable insights into nanoscale features, particularly surface roughness, complementing the comprehensive characterization of the membranes.

The zeta potential of the membranes before and after cleaning was measured via electrokinetic analyzer (SurPASS 3, Anton Paar, USA). Two membrane coupons of approx. dimensions 2 cm×1 cm were cut from each sample and exposed to electrolytes. The zeta potential was determined at various pH using KCl as an electrolyte solution with 0.01 M ionic strength. The pH ranged from 3 to 10, with a difference of 2. The adjustment of pH was achieved using 0.05 M HCl and 0.05 M NaOH solutions.

Figure 4:
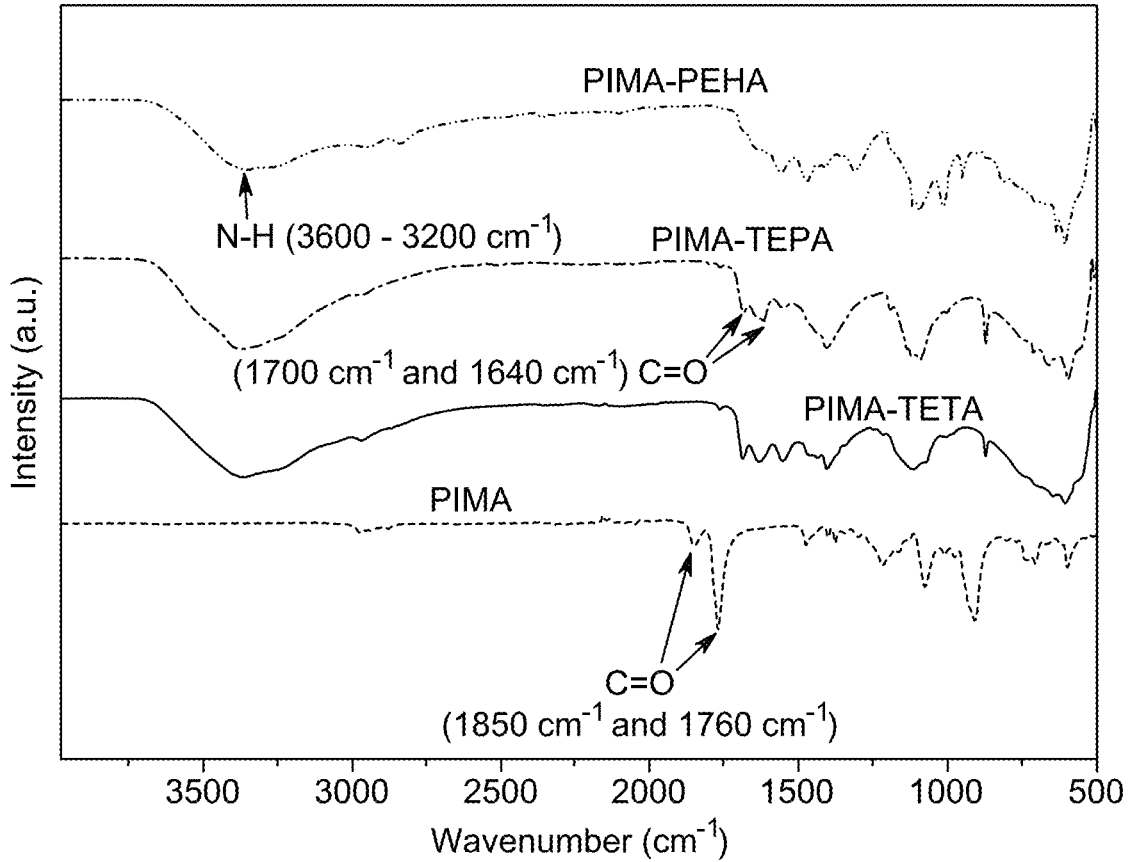
FIG. 4 shows a Fourier transform infrared spectra (FTIR) of poly[isobutylene-alt-(maleic anhydride)] (PIMA), PIMA-triethyl tetraamine (TETA), PIMA-tetraethylene pentaamine (TEPA) and PIMA-pentaethylene hexamine (PEHA) polymers, according to certain embodiments.
Figure 5A:
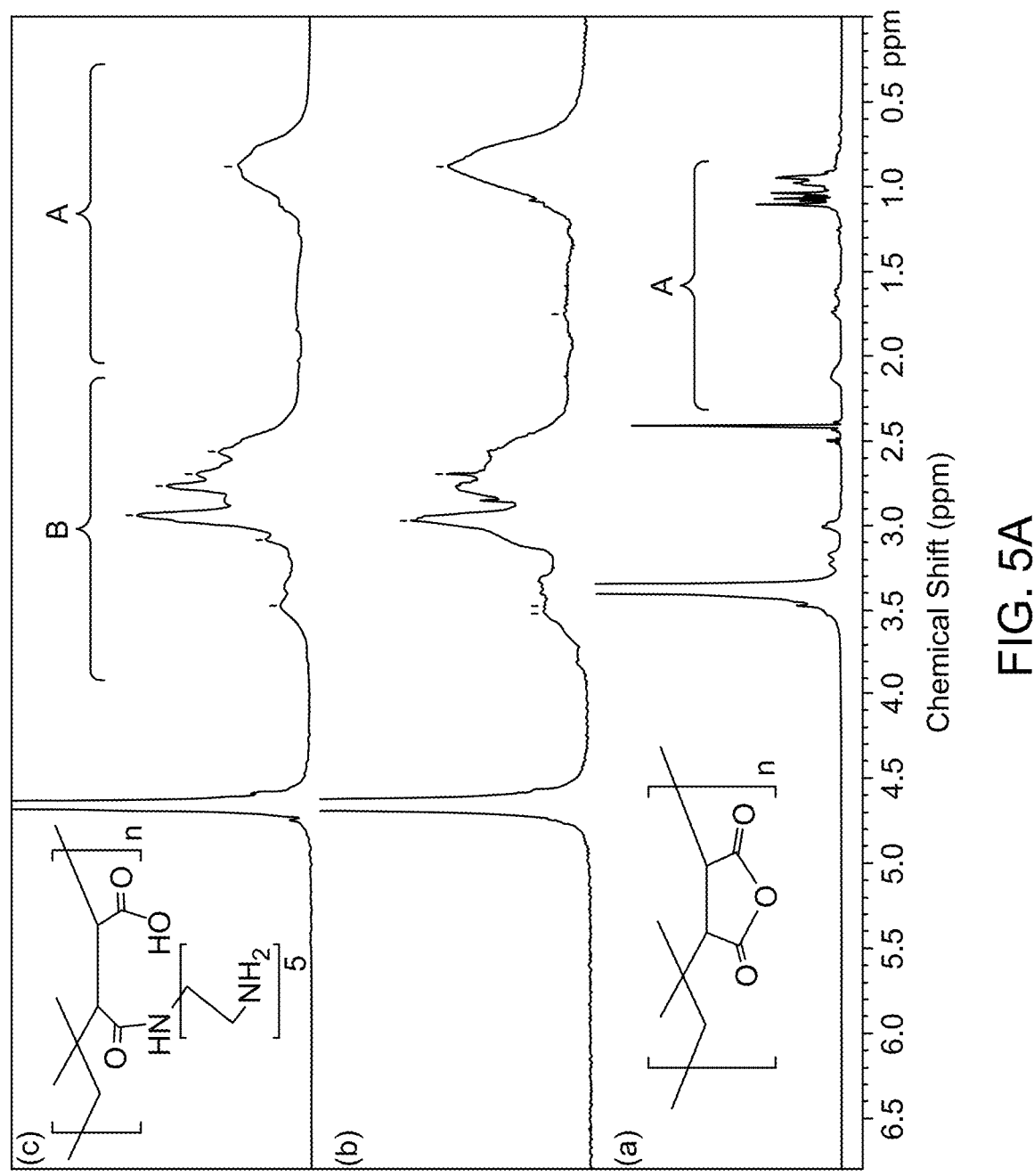
FIG. 5A shows a proton nuclear magnetic resonance ($^{1}$H NMR) spectra of PIMA in DMSO solvent, PIMA-TEPA in $D_2O$ solvent and PIMA-PEHA in $D_2O$ solvent, according to certain embodiments.
Figure 6A:
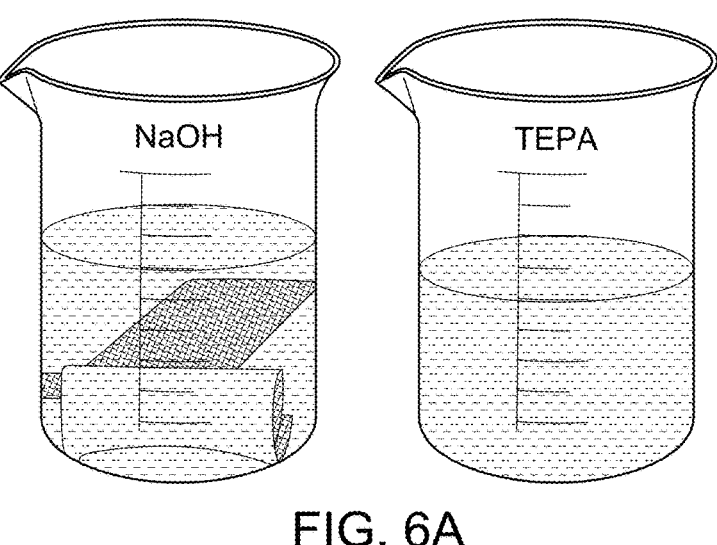
FIG. 6A shows breakers containing NaOH solution and TEPA solution used for cleaning a fouled reverse osmosis (RO) membrane, according to certain embodiments.
Figure 6B:
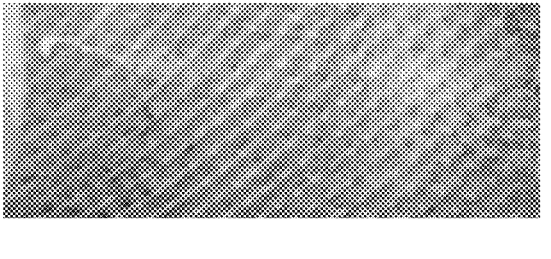
FIG. 6B shows a surface image of the fouled RO membrane surface after cleaning it with NaOH solution, according to certain embodiments.
Figure 6B:
Figure 6C:
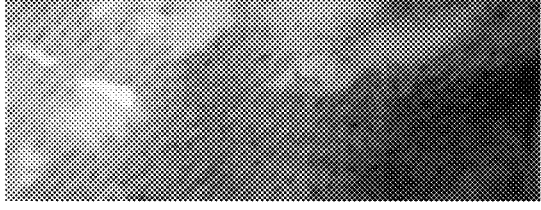
FIG. 6C shows a surface image of the fouled RO membrane surface after cleaning it with TEPA solution, according to certain embodiments.
Figure 6D:
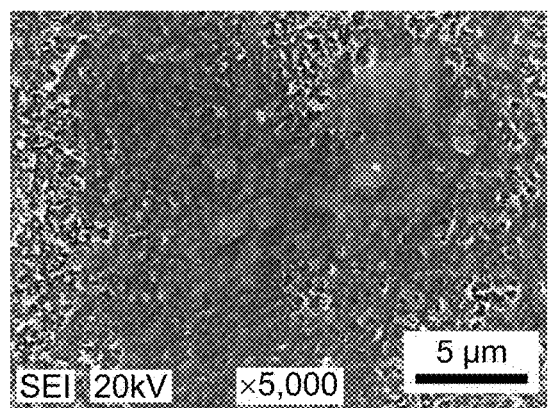
FIG. 6D shows a scanning electron microscopy (SEM) image of the fouled RO membrane after cleaning it with TEPA solution at a scale bar of 5 μm, according to certain embodiments.
Figure 6E:
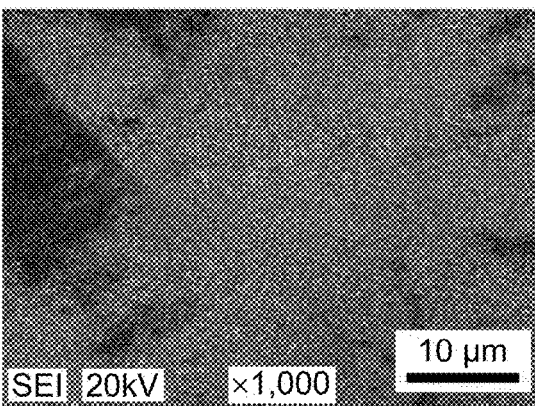
FIG. 6E shows the SEM of the fouled RO membrane after cleaning it with TEPA solution at a scale bar of 10 μm, according to certain embodiments.

The successful synthesis of all polymers was primarily validated through FTIR spectra, with NMR spectroscopy providing additional confirmation, as illustrated in FIG. 4 and FIG. 5, respectively. Distinct spectral data from the starting material, poly [isobutylene-alt-(maleic anhydride)], and the products (PIMA-TETA, PIMA-TEPA, and PIMA-PEHA), affirmed the grafting of ethylene amine compounds and justified the formation of the new compounds.

The FTIR spectrum for PIMA show peaks at around 1850 $cm^{-1}$ and 1760 $cm^{-1}$, characteristic of the double C$=$O groups in the maleic anhydride unit. These peaks in the spectra of the resulting PIMA-PEHA have disappeared, and in turn, we see the appearance of the C$=$O bond of the amide and carboxylic acid group functionality that can be seen around 1640 and 1700 $cm^{-1}$ respectively. An N—H stretching vibration band also appears at around 3200-3500 $cm^{-1}$. Similarly, for PIMA-TEPA and PIMA-TETA, the C$=$O peak shift and the appearance of the N—H band were realized, affirming the success of the synthesis.

The $^1$H NMR spectral data reaffirmed the successful synthesis of the target polymer products. By studying the individual spectrum obtained for each of polymer, we noticed broader peaks justifying the grafting success in the polymer backbone. In addition, peaks in FIG. 5A at up-field cover the region with characteristic peaks for the saturated alkane backbone of the polymer. At a relatively downfield region, the B (blue) shows the peaks in the oligoethyleneamine side chains. A broad peak can be seen at 3-3.5 ppm. This is due to the proton in a $CH_2$ unit adjacent to the primary amine in the oligoethyleneamine that is deshielded since they are in a new chemical environment with the carbonyl group, as opposed to their original situation in the unreacted oligoethyleneamine. The peak thus shifted downfield. The same kind of spectral data was for all the product polymers.

Figure 5B:
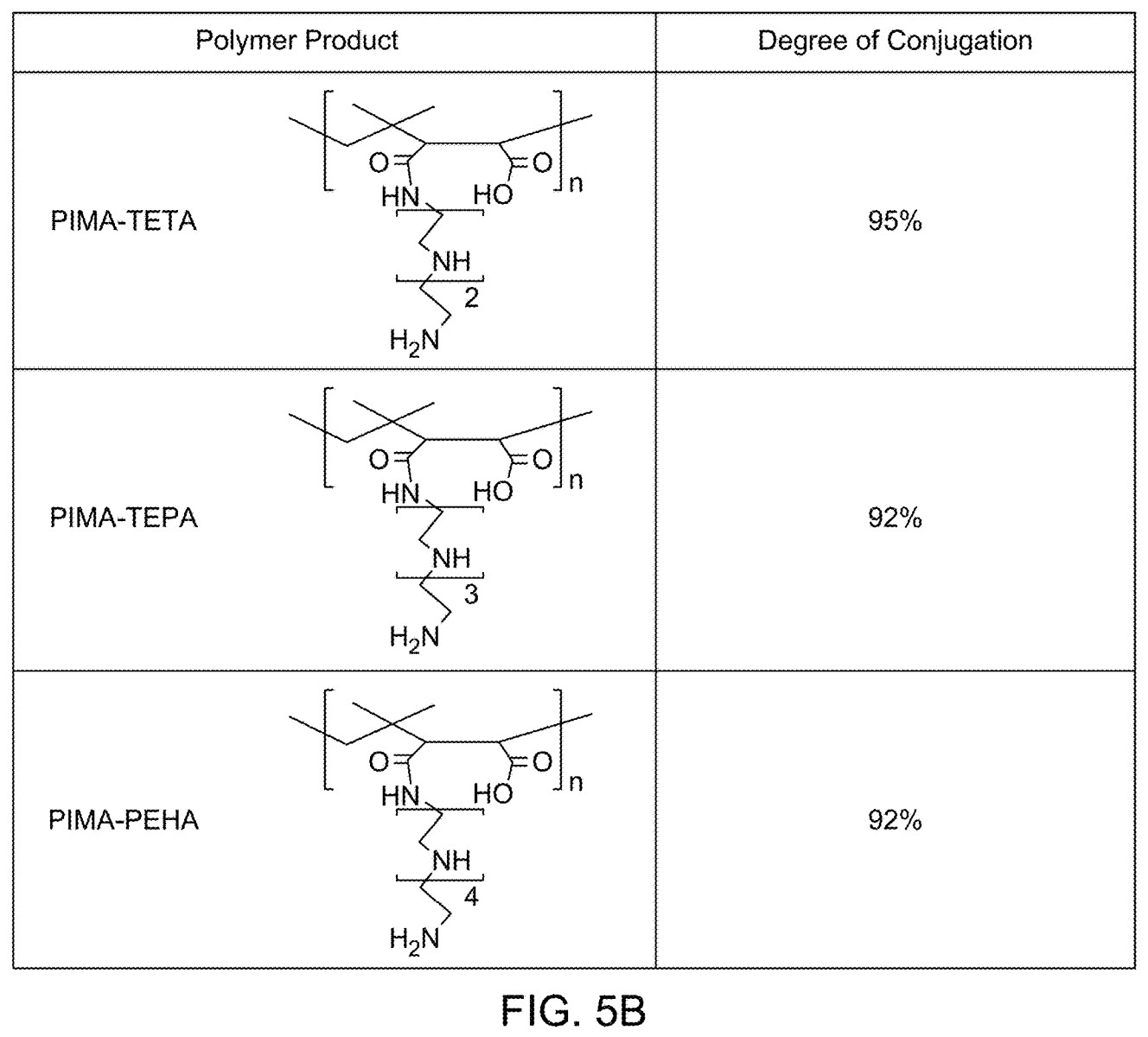

The $^1$H NMR analysis determined the degree of conjugation of the pendant oligoethyleneamine for each polymer product. This was done by comparing the integral values of the hydrophobic isobutylene backbone peaks with those of the peaks corresponding to the grafted hydrophilic oligoethyleneamine sidechains. FIG. 5B shows that the conjugation of the oligoethyleneamine units was highly successful and is similar to the data obtained by Khan et al. (2010) [Khan, et al., Macromol Rapid Commun 31, (2010) 1142, which is incorporated herein by reference in its entirety]. Overall, the degree of conjugation for all the oligoethyleneamine units tested was 92% or higher, with the longer oligoethyleneamine units having a degree of conjugation slightly lower than the shorter oligoethyleneamine units, this is in line with similar systems reported previously [Khan, et al., Macromol Rapid Commun 31, (2010) 1142, which is incorporated herein by reference in its entirety].

FIGS. 6A-6E shows some pictures of the cleaning solutions and the fouled membranes after the soak cleaning test. The cleaning solutions were maintained at a pH of 11.5 and temperature of 40° C. for 48 hours. The selection of the cleaning agent pH and temperature was based on the industrial conditions. It is observed that the TEPA solution turned brownish orange due to foulant removal from the membrane. In contrast, the pure alkali solution at the same pH and temperature remained clear. Images of the membranes taken after the soaking tests confirmed this observation as the membrane exposed to TEPA had some very clean portions. On the other hand, there was virtually no foulant removal from the NaOH-only sample. To confirm the extent of foulant removal from the clean white portions of the membrane, the contact angle was measured at different locations, and SEM images were also taken. The CA values of the clean areas (45°) were found to be very similar to those of the pristine membranes (44°). Moreover, the original peak-and-valley morphology of polyamide was clearly visible in the SEM images of the TEPA-cleaned membrane.

The membranes were first compacted at ~25 bars with DI water for 2-3 h. After the compaction, the pump speed and operational pressure were adjusted to 30 and ~20 bars respectively. The permeate flux was measured for all three cells by collecting permeate in glass vials. The feed was then equilibrated with $CaCl_2$) of concentration 100 ppm, as Ca is known to aggravate organic fouling [You, X., et al., Chemosphere 246, (2019) 125801, which is incorporated herein by reference in its entirety]. Thereafter, 100 mg/L of sodium alginate dissolved in DI water separately was then added to the feed. The permeate from all the cells was collected at regular hourly intervals and the flux was calculated.

Figure 7:
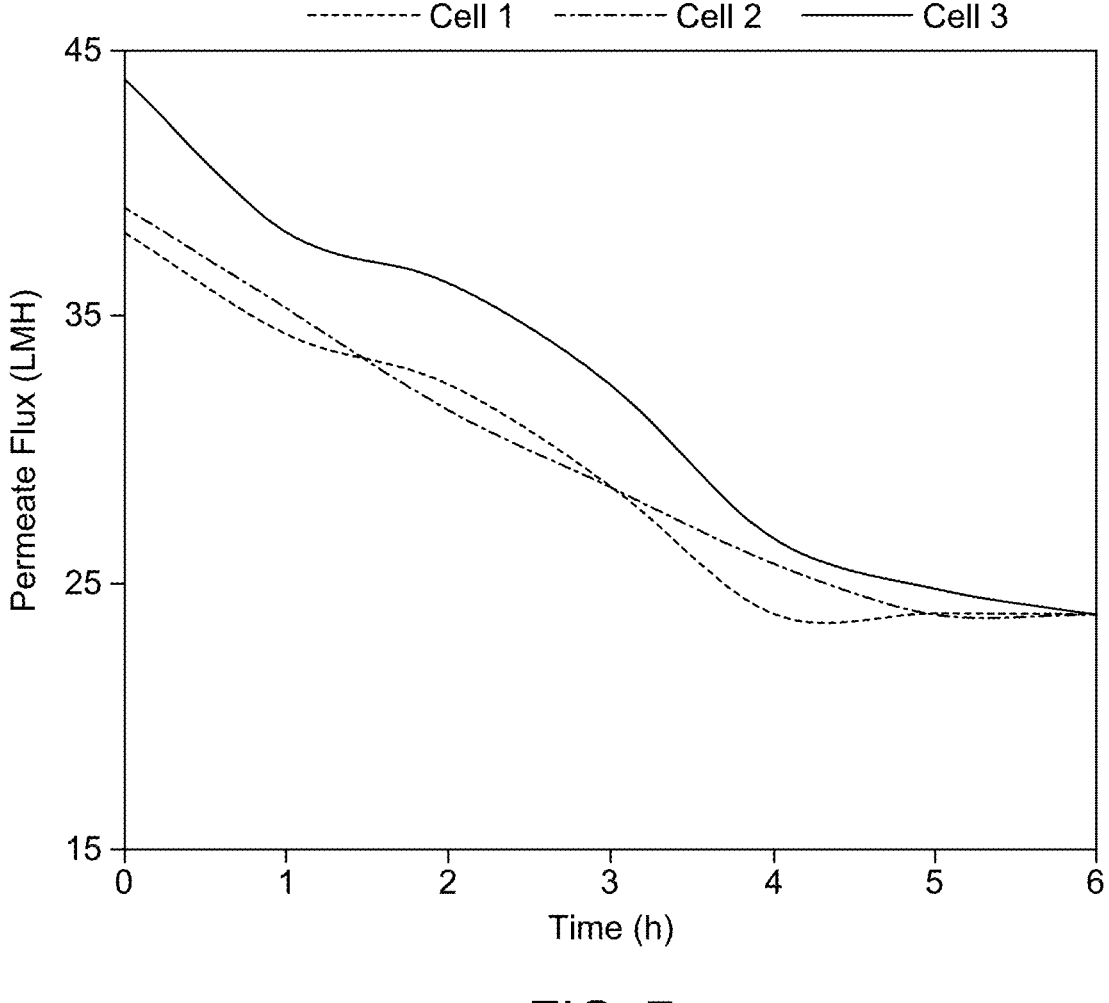
FIG. 7 is a graph showing the variation of permeate flux with time for the membranes in the presence of alginate feed, according to certain embodiments.

FIG. 7 shows the variation of flux with time after the addition of 100 mg/L alginate to the feed. The flux decreased quite rapidly with an overall decline of ~35-40% after 6 h. The significant decline can be explained by the presence of $Ca^{2+}$ in the solution that is known to act as a bridge between successive alginate layers [Erdal, N. B., et al. J Chem Educ 96, (2019) 1691-1695, which is incorporated herein by reference in its entirety], resulting in the formation of a gel-like fouling layer. In fact, to highlight the effect of $Ca^{2+}$, Elimelech, and colleagues performed alginate fouling runs both with and without $Ca^{2+}$ and one with $Mg^{2+}$ [Lee, S., et al. Environ Sci Technol 40, (2006) 980-987, which is incorporated herein by reference in its entirety].

Alginate gel formation in the presence of calcium ions has been explained by the "egg-box" model [Lee, S., et al. Environ Sci Technol 40, (2006) 980-987, which is incorporated herein by reference in its entirety]. In this model, calcium ions bind preferentially to the carboxylic groups of alginate (and acidic polysaccharides) in a highly cooperative manner and form bridges between neighboring alginate molecules, leading to the egg-box-shaped gel network. Preferential calcium-alginate complexation and gel formation in the presence of $Ca^{2+}$ have been reported elsewhere. Davis et al. demonstrated enhanced selectivity of alginate molecules for calcium and cadmium relative to magnesium [Davis, T. A., et al. Environ Sci Technol 37, (2003) 261-267, which is incorporated herein by reference in its entirety], leading to the formation of an alginate gel network. Bruus et al. reported that the stability of biological flocs formed with alginate increased significantly in the presence of calcium ions as compared to magnesium ions [Bruus, J. H., et al. Water Res 26, (1992) 1597-1604, which is incorporated herein by reference in its entirety], implying preferential alginate gel formation in the presence of calcium ions.

Figure 8A:
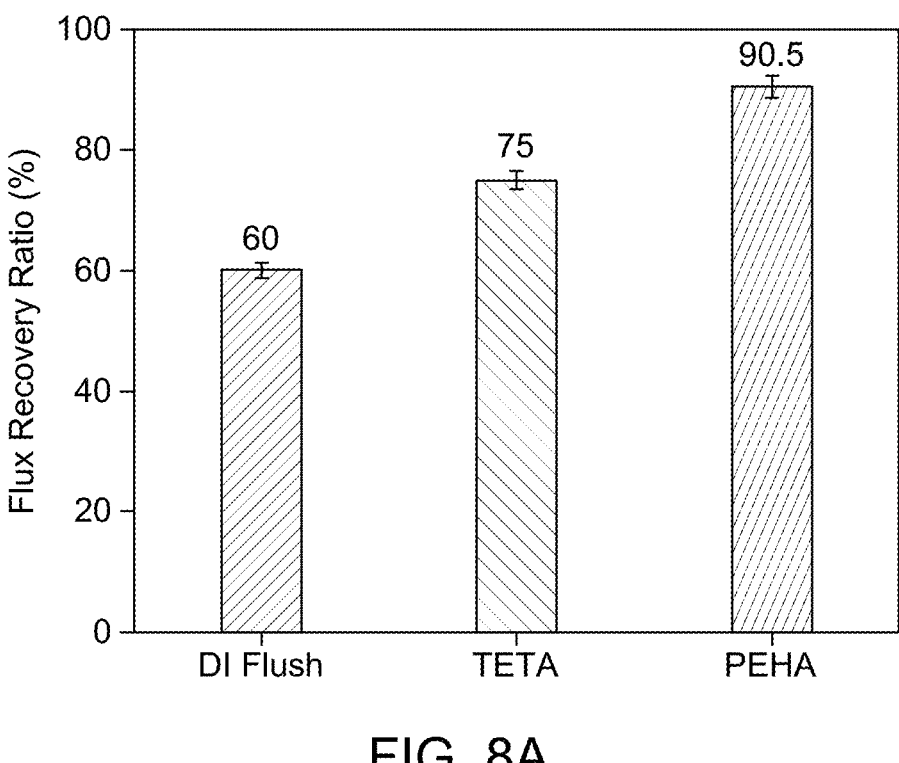
FIG. 8A is a bar graph showing the flux recovery ratio of the RO fouled membranes when washed using distilled (DI) water, TETA and PEHA solutions, according to certain embodiments.
Figure 8B:
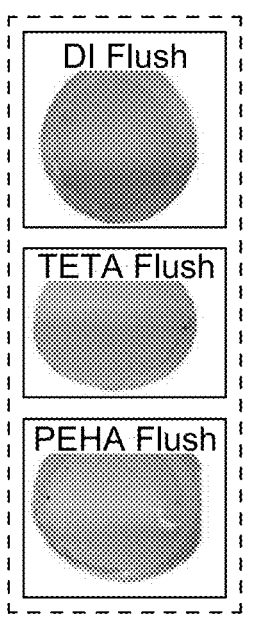
FIG. 8B shows the images of DI water flushed, TETA solution flushed, PEHA flushed RO membranes, according to certain embodiments.
Figure 8B:
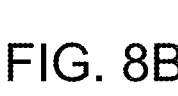

A good indicator of the cleaning efficacy is the flux recovery ratio after application of the cleaning protocol. FIG. 8A shows the flux recovery levels for the fouled membranes after the application of different cleaning regimes. Flushing with DI alone at a moderate pump speed (~20) and cross-flow velocity restores ~60% of the flux and the alginate fouling layer is visible on the entire surface. This indicates a high degree of irreversible fouling with the foulant layer strongly adhering to the membrane surface. This has been observed in several other studies on organic and biofouling, wherein flushing with DI water alone removes only the loosely bound fouling layer at the top. The denser and tightly packed layer at the bottom strongly adheres to the membrane surface and is not undone by shear forces only.

On the other hand, cleaning with the polymers with a surfactant-like molecular structure is more effective as evidenced by the cleaner membrane surface and the higher recovery levels (FIG. 8). For instance, cleaning with a 2.5 g/L TETA (triethyl tetraamine) solution at a pH of 11 and temperature of 40° C. gave a flux recovery of ~75%. In comparison, the polymer with a higher amine ratio, PEHA (pentaethylene hexamine), was even more effective, resulting in a recovery of >90%. Although possessing a similar backbone, in the form of polymaleic anhydride (PMA), the difference in the number of amine groups results in different cleaning efficiencies. TETA has a total of 4 amines with two primary and two secondary amines, which in the final polymer will result in one primary and two secondary amines per repeat unit. On the other hand, PEHA is composed of five ethylene groups —$CH_2CH_2$— joined together in a chain by four secondary amine groups (—NH—) and terminated on each end by one primary amine group (—$NH_2$), which give rise to four secondary amines and one primary amine per repeat unit in final polymer. Because of the Lewis basicity of the amine groups, PEHA could potentially act as a hexadentate ligand via the lone pairs on each nitrogen atom of the amine units, similar to the commercial chelating agent, EDTA, and thus form 6 co-ordinate bonds with a central metal ion. In addition, the foulant in this study is also a polymer, sodium alginate, that in water will possess a carboxylate anion groups in the backbone of sodium alginate, this group and the hydroxyl groups within the alginate backbone, allow the cationic amines in the comb-like polymers to interact with the foulant polymer via electrostatic interaction and extensive hydrogen bonding [Sinelnikova, D. G., et al. Mendeleev Communications 34, (2024) 31-33, which is incorporated herein by reference in its entirety]. As a result, the comb-like polymers can solubilize the foulant via electrostatic complex formation, as well as breaking down the layers of sodium alginate layers through the sequestration of $Ca^{2+}$ ions thus allowing the comb-like polymers to "lift off" the foulant from the membrane surface. The more cationic groups there are per repeat unit, the more extensive the ability of the comb-like polymers to interact with the foulant in the two methods described above. This could explain why the comb-like polymer with PEHA repeat unit is the most successful in cleaning the membrane surface and giving rise to higher recovery levels (FIG. 8B). The comb-like cationic polymers may act as cleaning agents via this dual-action mechanism.

Figure 8C:
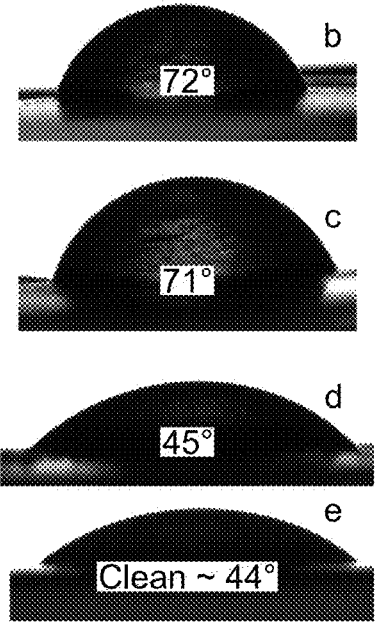
FIG. 8C shows average water contact angles values of a clean (pristine) RO membrane (a), DI water flushed RO foul membrane (b), TETA solution flushed RO foul membrane (c) and the PEHA solution flushed RO foul membrane (d), according to certain embodiments.

FIG. 8C also shows the average CA values and the water droplet images after cleaning the fouled membranes with different protocols. The membrane flushed with DI alone has a contact angle of 72°. A visual examination of the surface shows the presence of a continuous grayish layer of alginate [Alnajjar, H., et al. Sep Purif Technol 264, (2021) 118410, which is incorporated herein by reference in its entirety]. This is a good indicator of the high degree of fouling irreversibility due to high initial fluxes. Similar observations were reported by Ghaffour and co-workers who investigated the cleaning efficiency of saturated $CO_2$ against alginate fouling. They observed that a complete fouling layer was still visible even after flushing with DI. The membrane cleaned with TETA for 2 h showed similar wetting behavior to the one cleaned with DI. The average value for the contact angle was ~71°. This was confirmed by later SEM images that showed the presence of a fouling layer on the membrane surface. Although cleaning with TETA was more effective than DI alone in terms of flux recovery, it was unable to remove the foulant layer next to the membrane surface. In contrast, cleaning with PEHA effectively restored the original wetting behavior of the membrane surface. As is evident from the flux recovery and SEM mages, it can remove most of the foulant next to the membrane surface.

Figure 9:
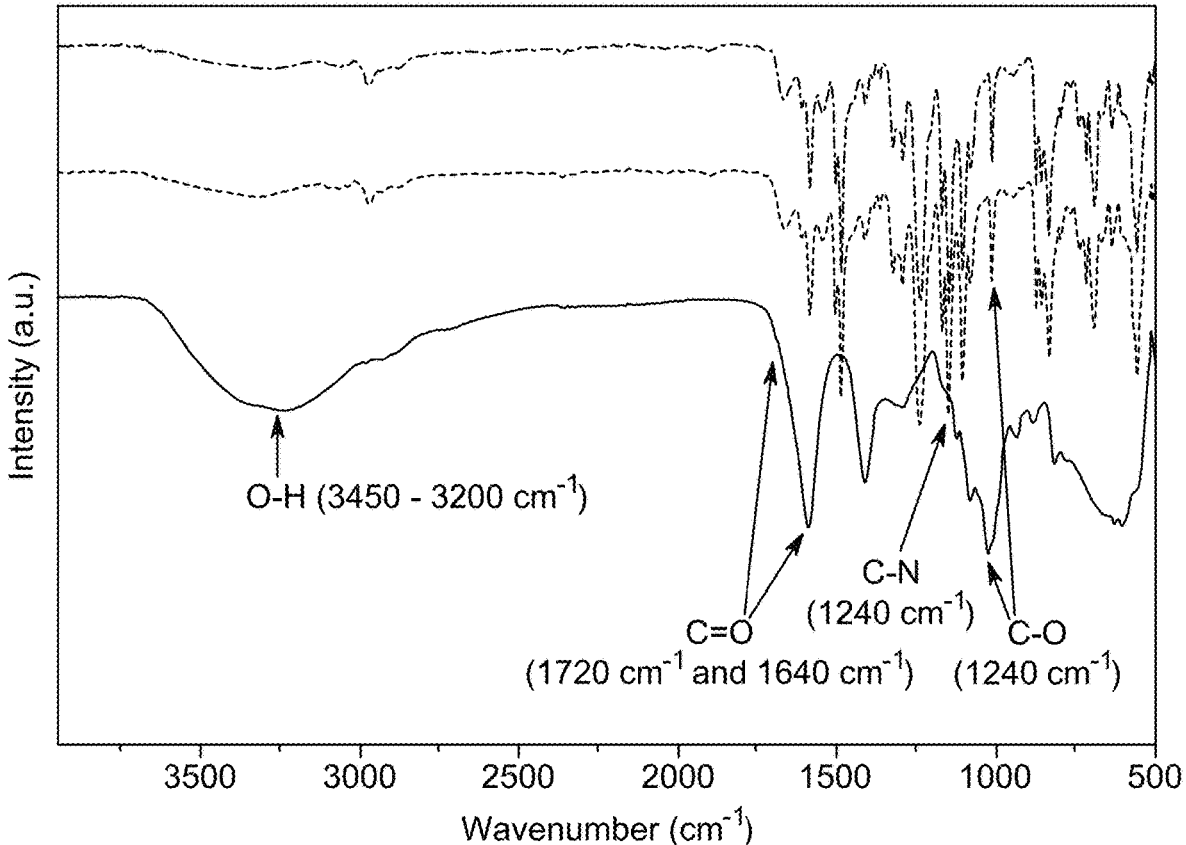
FIG. 9 shows a FTIR spectra of a pristine membrane, DI water flushed and PEHA solution flushed RO membrane, according to certain embodiments.

The pristine membrane spectrum in FIG. 9 shows no significant fouling-related peaks, reflecting its clean state. In contrast, the DI Flushed membrane exhibits C=O stretching at $1720$ cm$^{-1}$ and $1640$ cm$^{-1}$, indicating carboxyl and amide groups from alginate fouling. A broad O—H stretching band ($3300$-$3200$ cm$^{-1}$) further confirms strong hydrogen bonding within the fouling layer. After PEHA cleaning, these fouling-related peaks diminish, and the spectrum closely resembles the Pristine membrane. The disappearance of C=O bands and reduced O—H absorption indicate effective foulant removal. Minor C—N (~$1240$ cm$^{-1}$) and C—O (~$1030$ cm$^{-1}$) peaks indicate minimal residue from the cleaning agent. These results confirm that PEHA effectively restores the membrane, whereas DI flushing alone is inadequate.

FIGS. 10A-10H is a collection of SEM images and EDX spectra of the membranes after cleaning with different regimes and the pristine membrane. The sample flushed with DI alone shows a continuous fouling layer on the surface with the original polyamide morphology completely invisible. Also, crystals of salts are seen dispersed throughout the surface. The fact that only $CaCl_2$) was added to the feed and EDX spectra show appreciable amounts of Ca, concludes that these are Ca salts. This observation is consistent with previous studies, since hydraulic cleaning removes the loosely attached fouling layer from the top surface only. Similar results are obtained for biofouling as well [Amin, N. A., et al. npj Clean Water 6, (2021) 1-12, which is incorporated herein by reference in its entirety].

An almost continuous fouling layer is also visible after cleaning with TETA at an alkaline pH and at 40° C. for 2 h. The ridge and valley structure of polyamide is still not visible, indicating the inefficacy of this cleaning agent in removing the foulant next to the membrane surface. However, findings from EDX analysis reveal a difference in the surface composition of these membranes compared to the ones flushed with DI alone. The C:O ratio is appreciably higher than the latter and the Ca content significantly lower. The increase in C:O ratio points out to reduced presence of sodium alginate on the surface.

The above findings agree with the flux recovery data (FIG. 13A) and the contact angle results (FIG. 8C). For instance, the sample flushed with DI alone has a C:O ratio of around 1; in fact, the O content (~44%) is slightly higher than the C (~41%). In addition, the $Ca^{2+}$ content is also quite high (9.2%), which can be attributed to their presence in between the alginate layers acting as a bridge. These statistics confirm the presence of thick foulant on the surface. Cleaning with the polymers alters the surface chemistry due to higher foulant removal. After cleaning the fouled membrane with TETA, the C:O ratio increased to ~2:1 and the Ca content decreased to 1.7%. Although the SEM images show the presence of a continuous fouling layer and the absence of polyamide morphology, this shows the ability of TETA to remove several fouling layers. Cleaning with PEHA at a pH of 11, almost restored the original surface chemistry of the RO membranes. As can be seen from the EDX spectra, the C:O ratio increased to ~4:1 and became very similar to that of the pristine membrane. This is accompanied by an appreciable reduction in the presence of $Ca^{2+}$, down to less than 1% in some regions. The other notable change is the marked increase in the S content from a mere 1.6% for the membrane flushed with DI alone to ~8% for the one cleaned with PEHA. Since the foulant remaining on the membrane surface is negligible, the EDX rays can reach a good portion of the polysulfone support layer in the membrane. There is some variation in the N content because there are two potential sources for the N content: (i) the polyamide active layer, (ii) the cleaning polymer with amine groups.

Figure 10A:
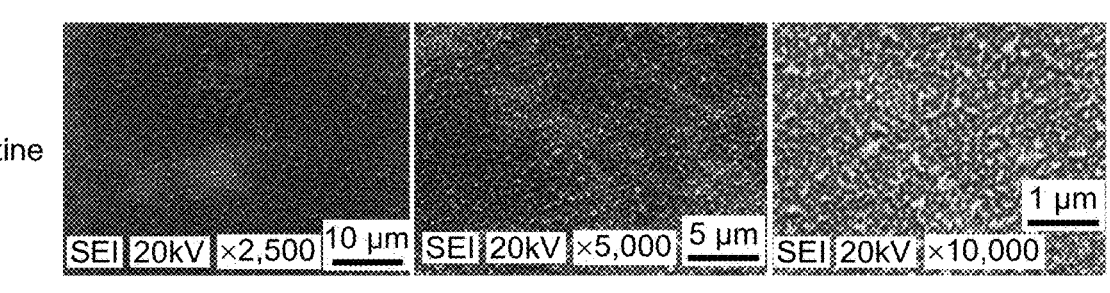
FIG. 10A shows the SEM images of the pristine RO membrane at a scale bar of 10 μm, 5 μm and 1 μm respectively, according to certain embodiments.
Figure 10B:
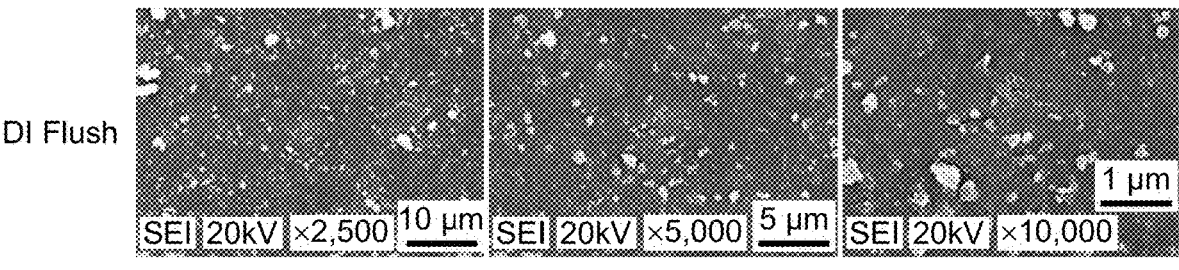
FIG. 10B shows the SEM images of the DI water flushed fouled RO membrane at scale bars of 10 μm, 5 μm and 1 μm respectively, according to certain embodiments.
Figure 10C:
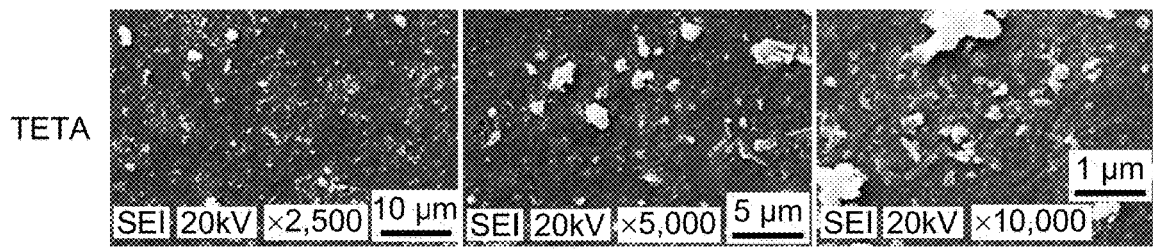
FIG. 10C shows the SEM images of the TETA solution cleaned fouled RO membrane at scale bars of 10 μm, 5 μm and 1 μm respectively, according to certain embodiments.

FIGS. 11A-11D shows some representative 2D and 3D images and values of the roughness parameters for the membranes cleaned with different protocols as well as the pristine. The sample flushed with DI alone shows a nonuniform topography with a mixture of high peaks and deep valleys. This is quite typical of heavily fouled surfaces. The average and root mean square roughness were ~85 nm and ~120 nm respectively, which are much higher than the values for the pristine membrane (~34 and 45 nm). The high peaks (bright regions in the images) are most likely the salt crystals deposited on the fouling layer as observed in the earlier SEM images (FIG. 10B). Another notable feature is the high difference between the highest peak and the deepest valley, corresponding to an Sy value of ~1283 nm.

Figure 13A:
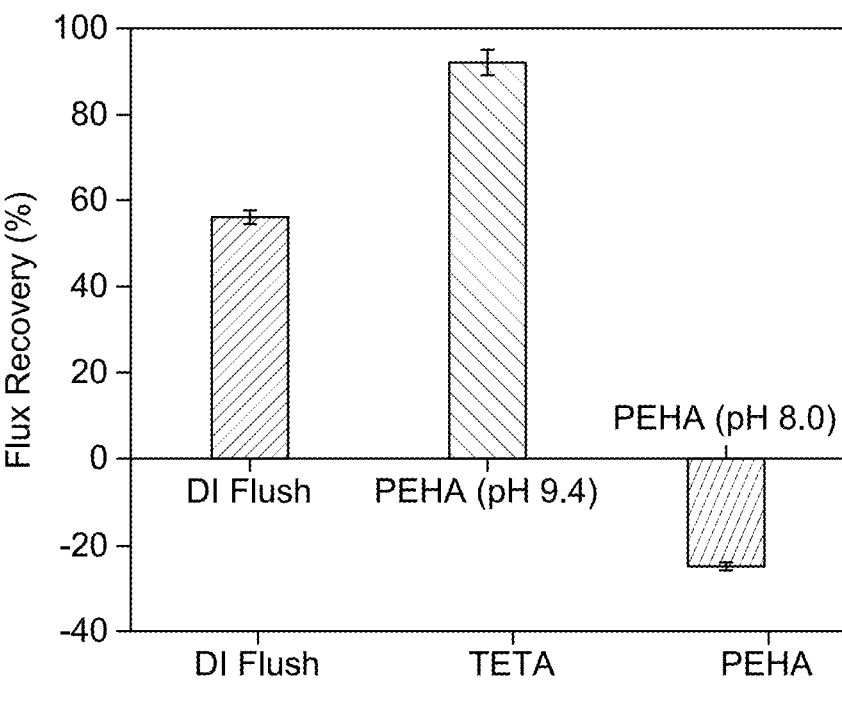
FIG. 13A is a bar graph showing flux recovery of the fouled RO membrane after cleaning with DI water, PEHA solution at pH 9.4 and pH 8.0, according to certain embodiments.

Cleaning with the amphiphilic polymers resulted in a smoother topology as evidenced by the images and roughness statistics. For the membrane cleaned with TETA, which still had the fouling layer present over the entire surface, the average and rms values were reduced to ~72 nm and 97 nm respectively. This can be explained by the reduced thickness of the alginate fouling layer as witnessed by the higher flux recovery (FIG. 13A). However, since a continuous fouling layer is still there with the sporadic presence of salt crystals (FIG. 10C), the average roughness was quite higher than the pristine membrane.

Figure 10D:
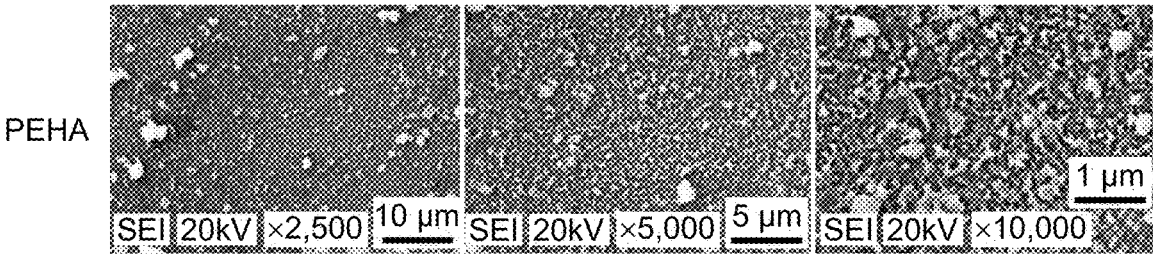
FIG. 10D shows the SEM images of the PEHA solution cleaned fouled RO membrane at scale bars of 10 μm, 5 μm and 1 μm respectively, according to certain embodiments.
Figure 10E:
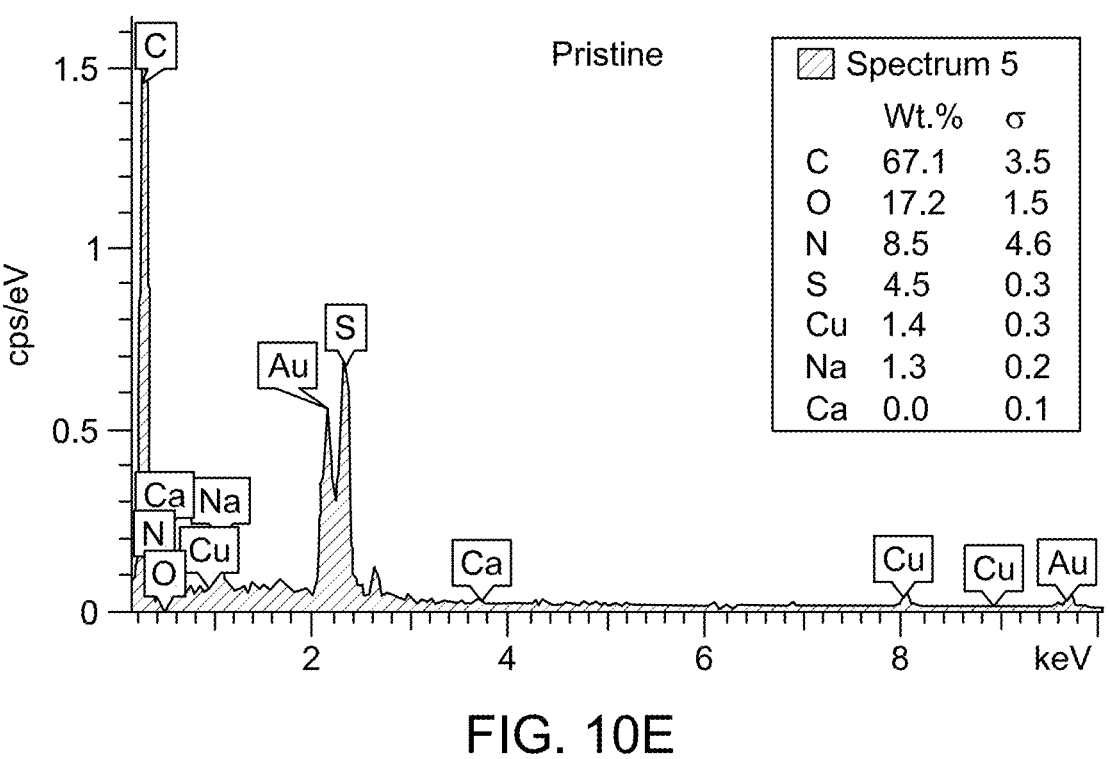
FIG. 10E shows an energy dispersive X-ray (EDS) spectrum of the pristine RO membrane, according to certain embodiments.
Figure 10F:
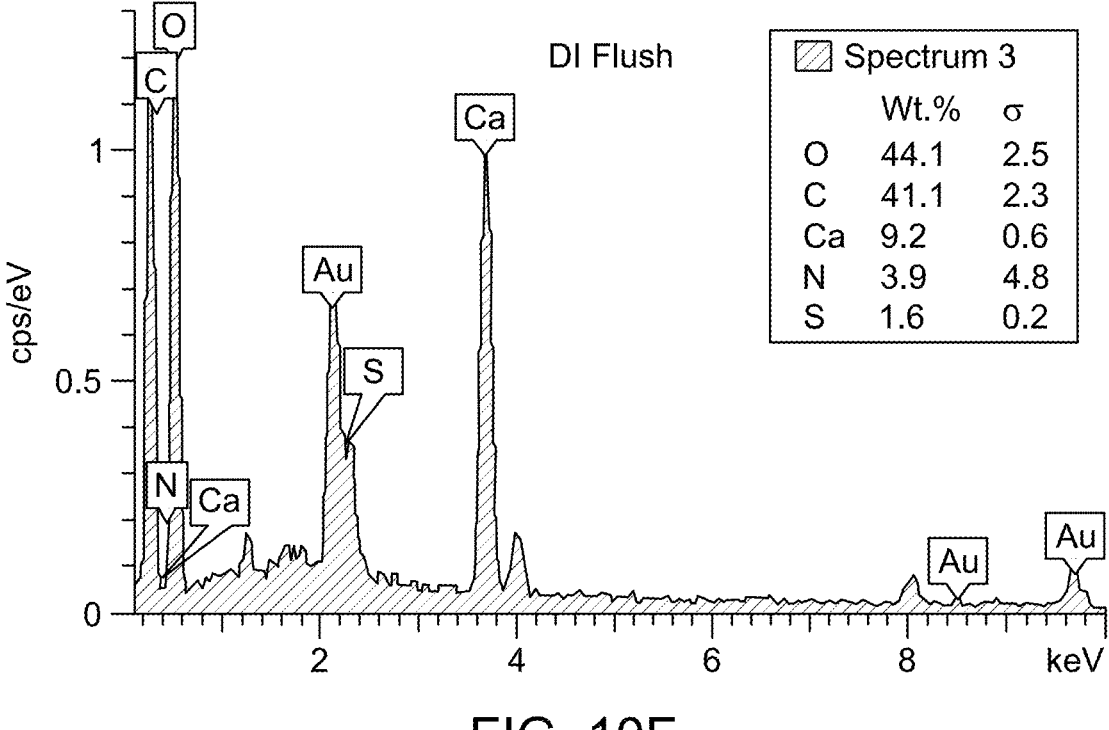
FIG. 10F shows the EDS spectrum of the DI water flushed fouled RO membrane, according to certain embodiments.
Figure 10G:
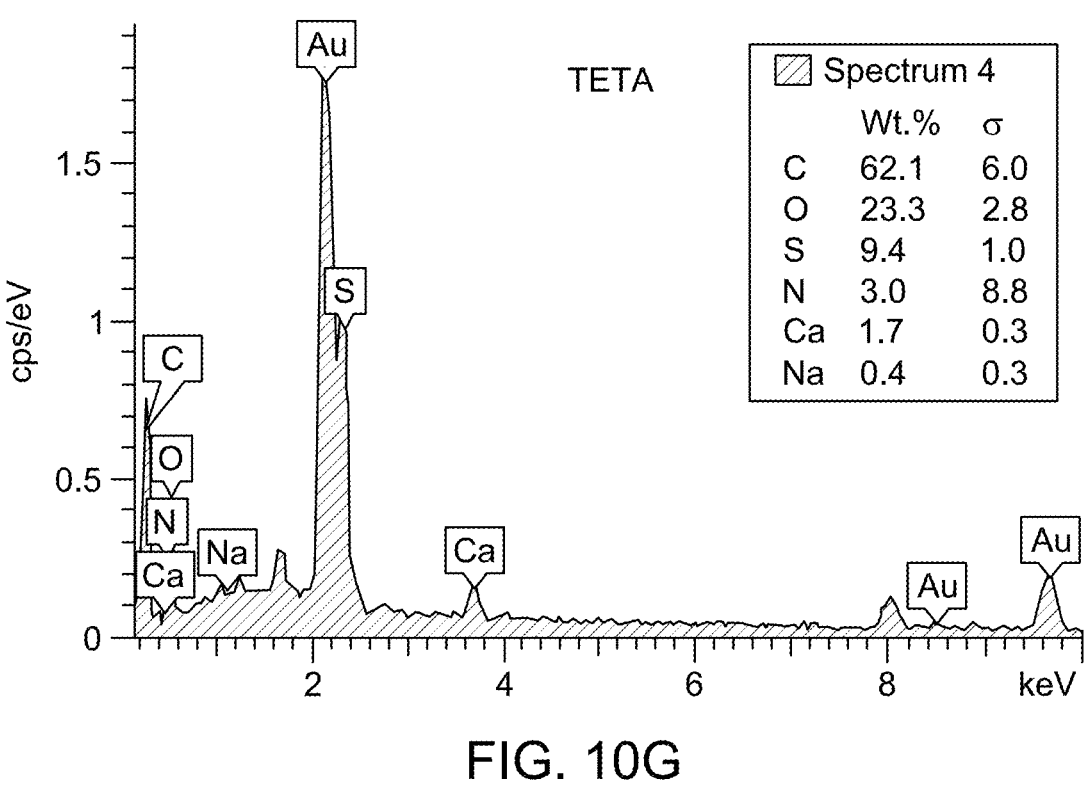
FIG. 10G shows the EDS spectrum of the TETA solution cleaned fouled RO membrane, according to certain embodiments.
Figure 10H:
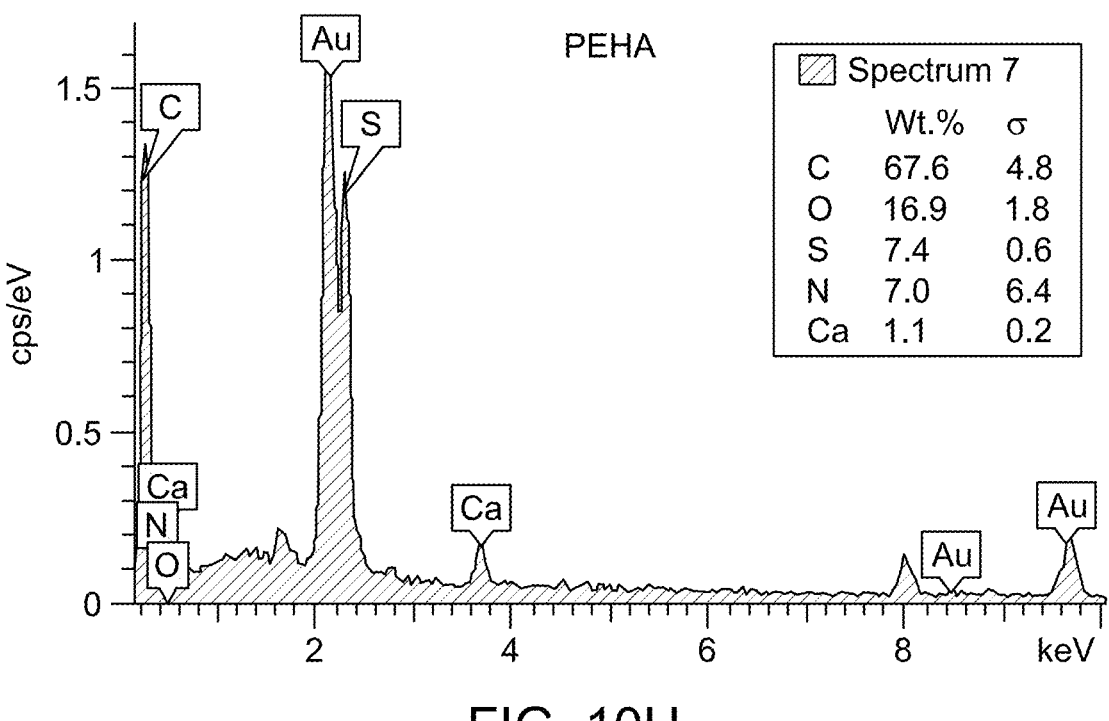
FIG. 10H shows the EDS spectrum of the PEHA solution cleaned fouled RO membrane, according to certain embodiments.
Figure 11A:
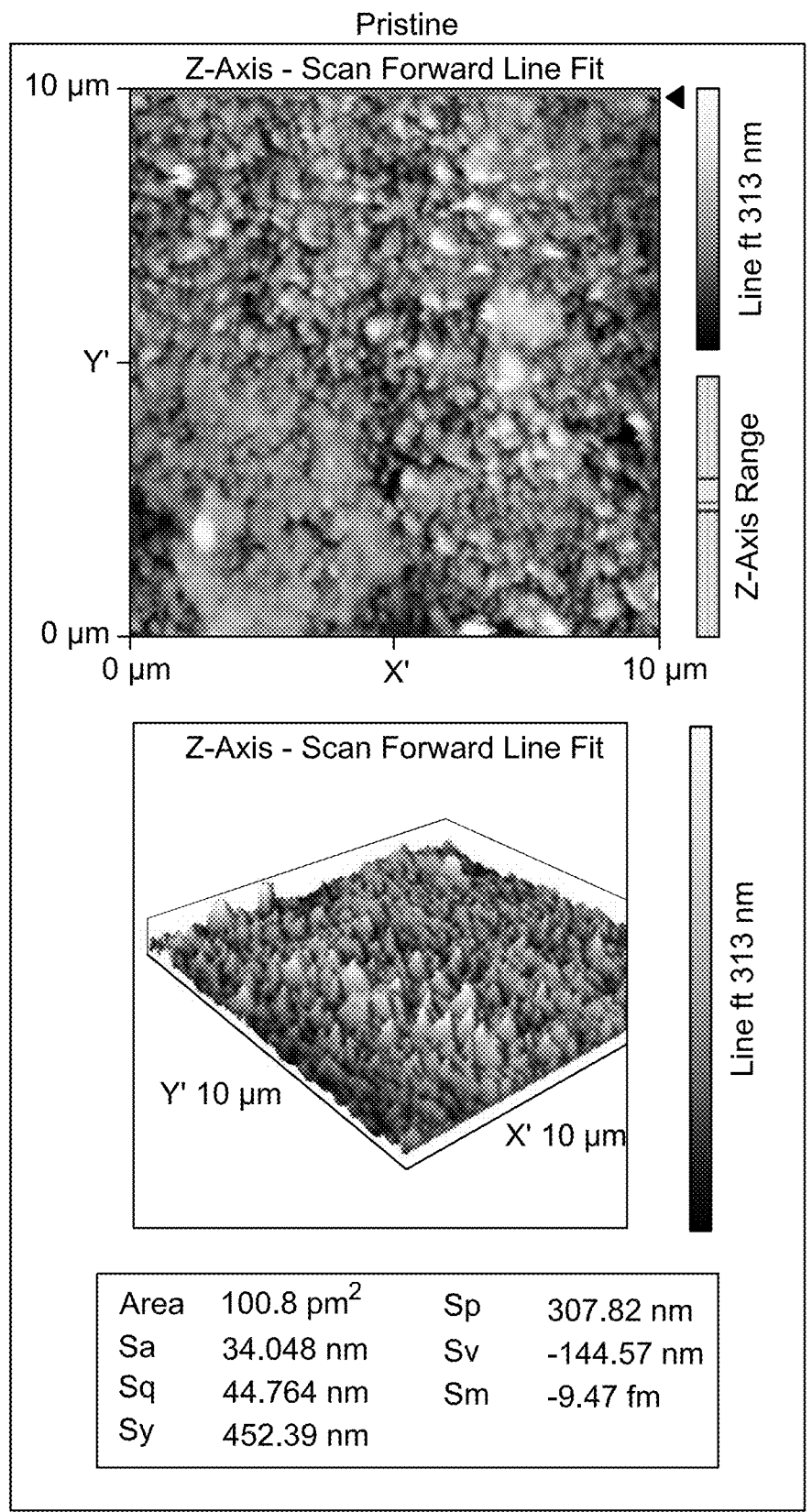
FIG. 11A shows atomic force microscopy (AFM) images and roughness statistics of the pristine RO membrane, according to certain embodiments.
Figure 11B:
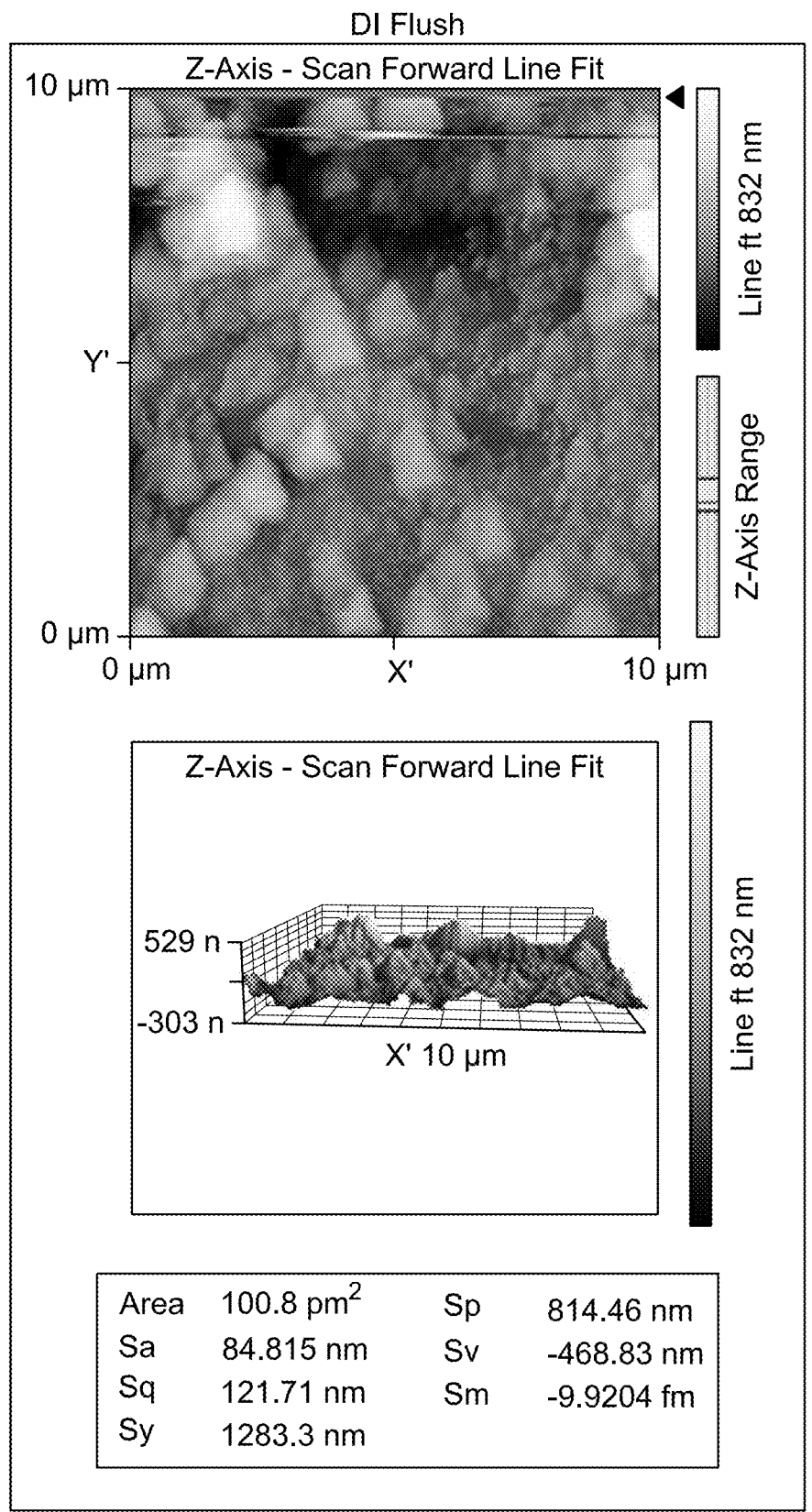
FIG. 11B shows the AFM images and roughness statistics of the DI water flushed fouled RO membrane, according to certain embodiments.
Figure 11C:
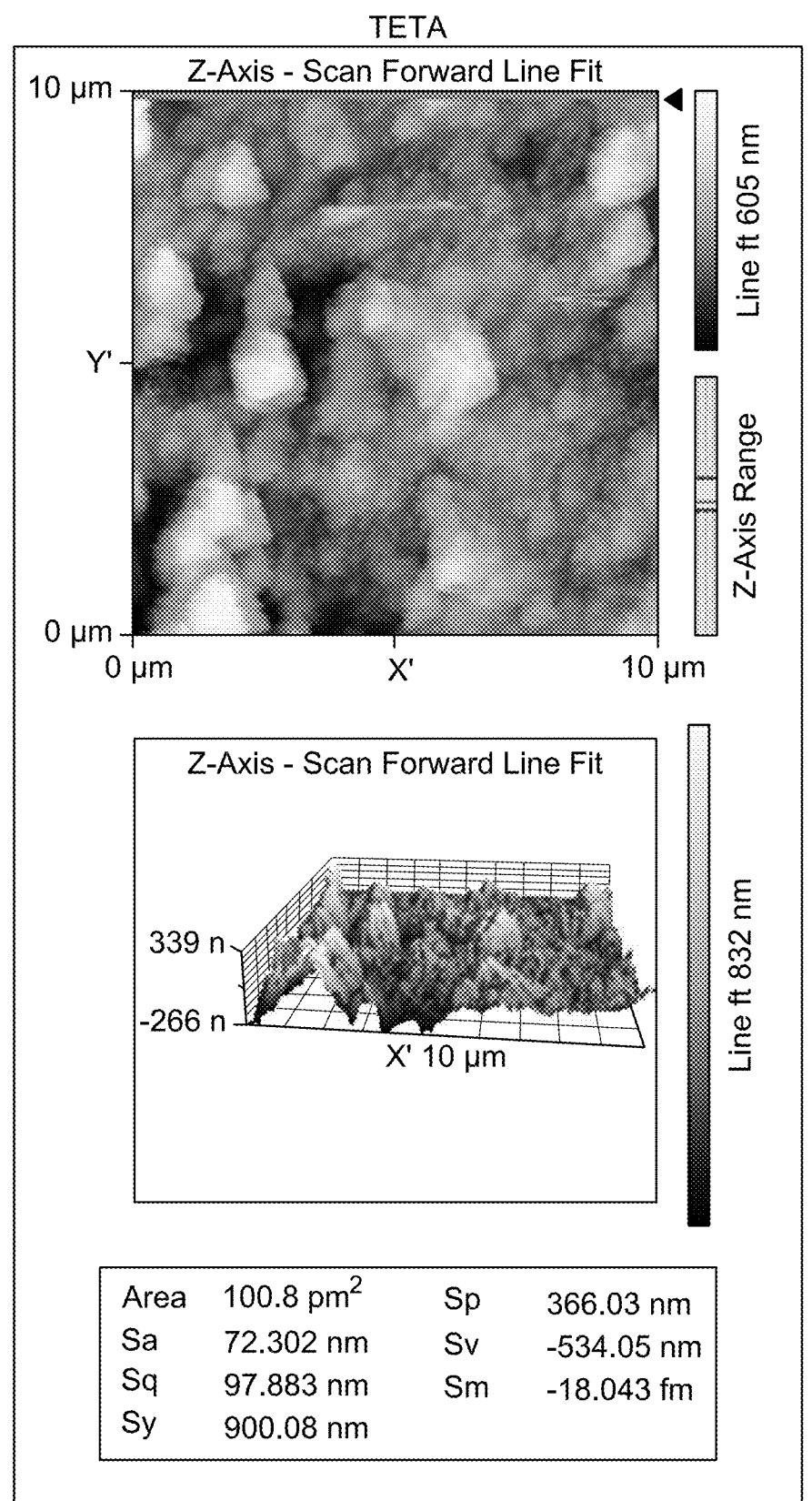
FIG. 11C shows the AFM images and roughness statistics of the TETA solution cleaned fouled RO membrane, according to certain embodiments.
Figure 11D:
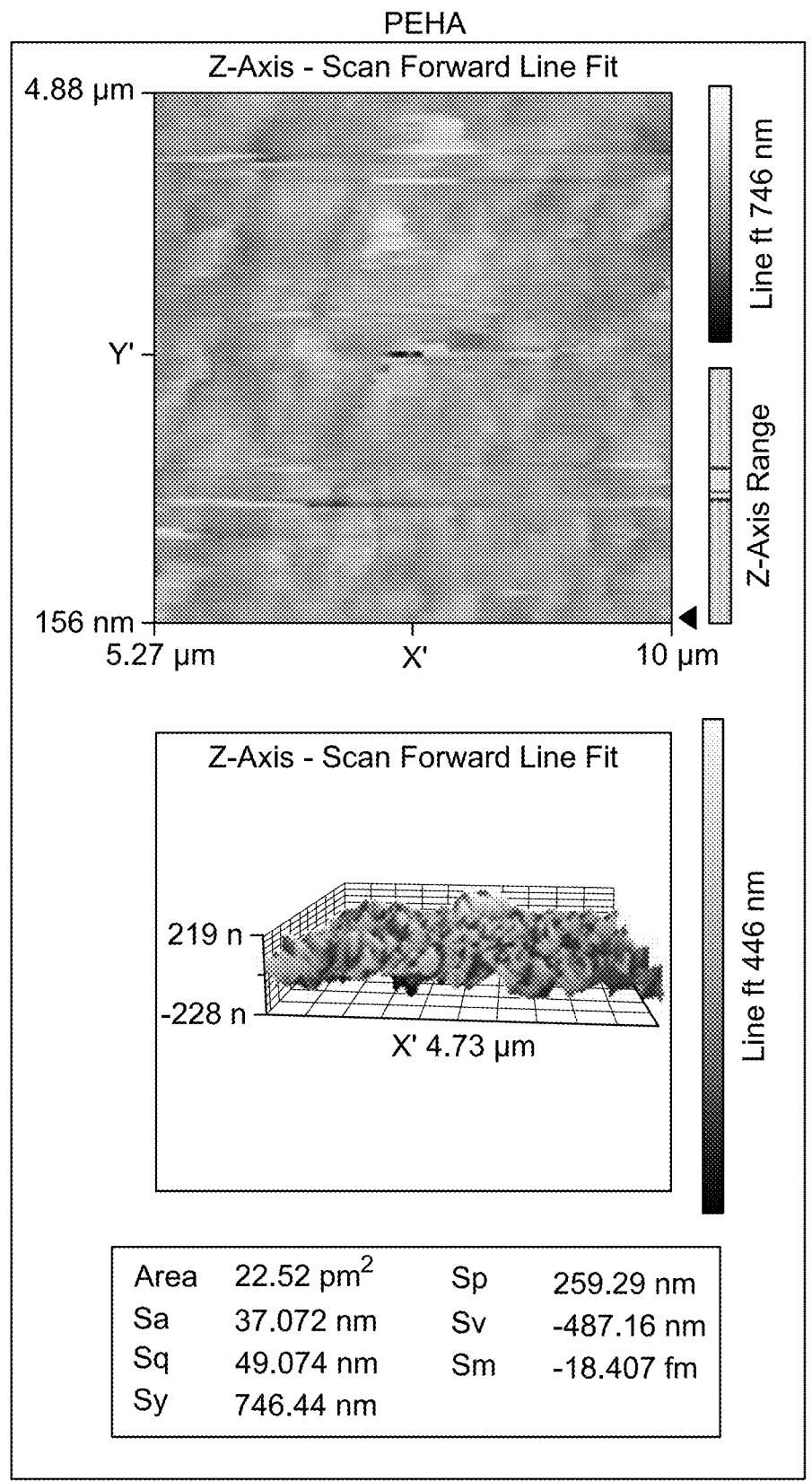
FIG. 11D shows the AFM images and roughness statistics of the PEHA solution cleaned fouled RO membrane, according to certain embodiments.

The membrane nearest to the pristine in terms of surface topography was the one cleaned with PEHA. As can be seen in the images, the peaks and valleys are more uniform and consistent with those of the PA layer. The values of the roughness parameters (37 nm and 49 nm) are similar to those of the pristine unfouled membrane [Baig, N., et al. J Environ Chem Eng 10, (2022) 108943, which is incorporated herein by reference in its entirety]. The presence of a few high peaks agrees with earlier SEM images that show the sporadic distribution of foulant debris and some crystals on the surface (FIG. 10D). It is worth mentioning that even for the membrane cleaned with PEHA, one can observe variations in the roughness profiles between different regions. For instance, some areas showed an average roughness as high as 92 nm and higher peaks. The AFM scan is done in a much smaller area (5-10 μm) in comparison to the SEM images at lower magnifications.

Figure 12:
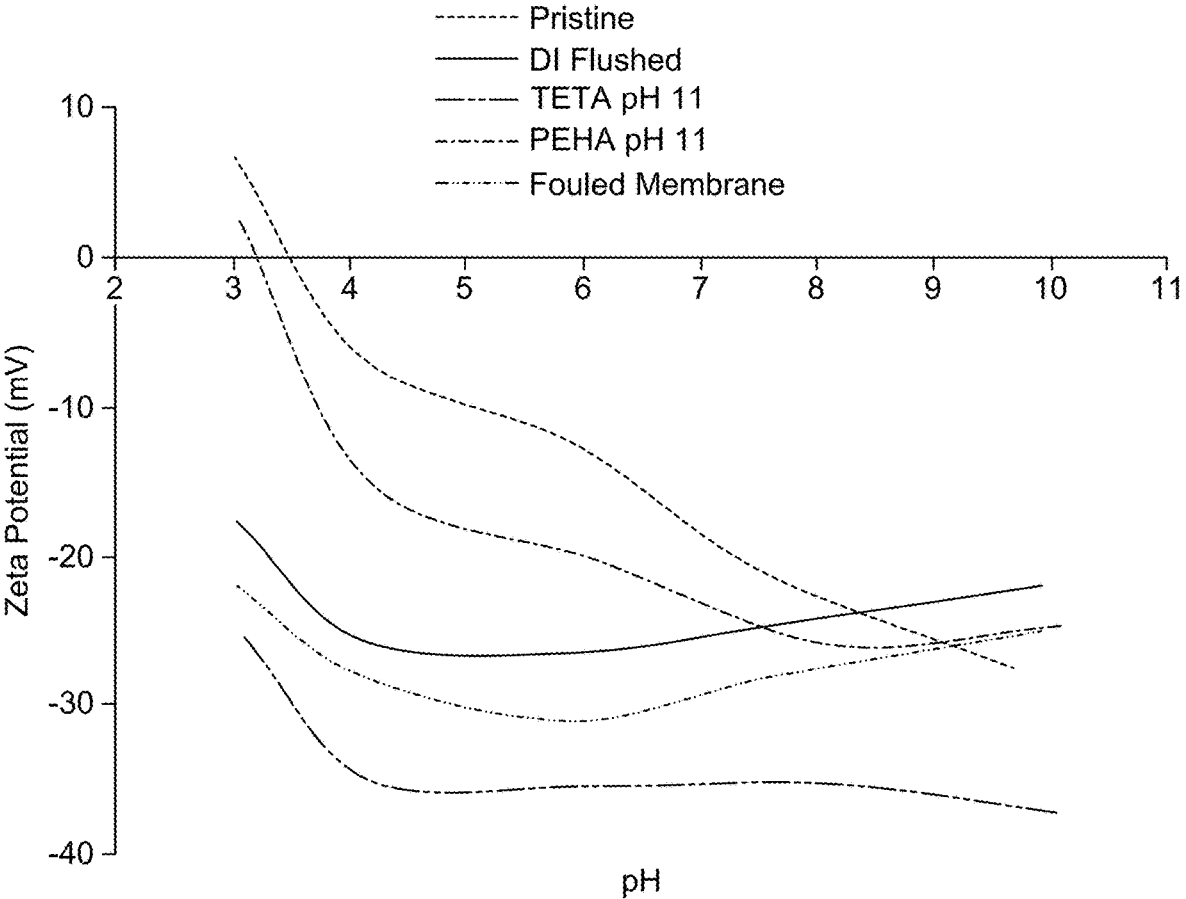
FIG. 12 shows the variation in zeta potential values as a function of pH change of pristine RO membrane, DI flushed RO membrane, TETA solution cleaned RO membrane, PEHA solution cleaned RO membrane and fouled RO membrane, according to certain embodiments.

FIG. 12 plots shows the zeta values for the original membrane and after the application of different cleaning protocols on the fouled membrane. The virgin unfouled membrane follows a trend similar to most commercial membranes [Idil Mouhoumed, E., et al. J Memb Sci 461, (2014) 130-138, which is incorporated herein by reference in its entirety] an isoelectric point between 3 and 4 increases the negative charge with the pH. This is associated with the deprotonation of the carboxyl groups (COO−) that are present on the polyamide surface due to unreacted acyl chloride groups [Khoo, Y. S., et al. Journal of Industrial and Engineering Chemistry 102, (2021) 271-292, which is incorporated herein by reference in its entirety]. Fouling alters the charge on the membrane surface as the PA functional groups are now shielded from the surrounding electrolyte. It has been noted that the membrane cleaned with PEHA at a pH of 11 exhibits a trend similar to the original membrane: the IEP is between 3 and 4 and the decrease in zeta potential levels off around a neutral pH. This is consistent with the fact that the carboxylic groups of the PA layer completely deprotonate around pH of 7.

In contrast, the zeta potential for the membranes cleaned with DI alone and with 2.5 g/L of TETA solution experiences a minimum value between pH 4 and 5 and then remains virtually unchanged with increasing pH. This is consistent with the fact that the deprotonation of the carboxylic groups on the alginate molecules reaches near completion at these pH values [Hoang, T., et al. Desalination Water Treat 50, (2012) 220-225; Ang, W. S., et al. J Memb Sci 382, (2011) 100-106, which are incorporated herein by reference in its entirety] explored the efficacy of a dual-step cleaning method with RO membranes fouled by wastewater effluent. They observed that the acidity of a 0.1 g/L alginate solution (similar to this disclosure) reached its maximum value around a pH of 5.

Also, if extrapolated, the isoelectric points for these membranes will be somewhere between 1 and 2 which again is consistent with the IEP of alginate. Similar trend was observed when several different commercial RO/NF membranes [Tang, C. Y., et al. Environ Sci Technol 41, (2007) 942-949, which is incorporated herein by reference in its entirety] were fouled with humic acid in the presence of 1 mM $Ca^{2+}$.

Alkaline solutions clean organic-fouled membranes by hydrolysis and solubilization. Alkaline solutions increase the solution pH and therefore increase the negative charge and solubility of the organic foulant. For example, when carboxylic functional groups of the organic foulant are deprotonated at alkaline conditions, solubility increases by nearly three orders of magnitude. After the initial success with PEHA at a pH of ~11.4, and to further investigate the effect of pH on cleaning efficiency, the fouled membranes were cleaned at two different pH values: 8 and 9.4. FIG. 13A shows the flux recovery for the membranes cleaned at these pH values while keeping the other conditions the same. The membrane cleaned at a pH of 9.4 exhibits flux recovery ~92% which is comparable to pH 11.4, while cleaning at a pH of 8 results in a negative recovery.

Figure 13B:
FIG. 13B shows the images of the fouled RO membranes cleaned with the DI water, PEHA solution at pH 9.4 and pH 8.0, according to certain embodiments.

The pictures of the samples shown in FIG. 13B highlight the difference in the effectiveness of the different pH values. While the surface of the membrane cleaned at a pH of 9.4 appears very clean and almost identical to the virgin membrane, a continuous foulant layer is visible on the sample cleaned at pH 8. In addition, it appears very similar to the surface flushed with DI alone. The negative recovery implies that the flux decreases after the application of the cleaning protocol. This comes about due to the adsorption of cleaning agent molecules on the membrane surface and the subsequent modification of surface characteristics such as hydrophobicity, pore size, and chemistry. Similar patterns have been observed in recent studies on membrane fouling and cleaning. For instance, Zhao et al. investigated the cleaning efficiencies and mechanisms of a variety of cleaning agents for NF membranes used for the desalination of produced water. They observed that cleaning with one of the surfactants, cetyltrimethylammonium chloride (CTAC), resulted in a flux decline of ~25% [Zhao, D., et al. Science of The Total Environment 652, (2019) 256-266, which is incorporated herein by reference in its entirety].

Figure 13C:
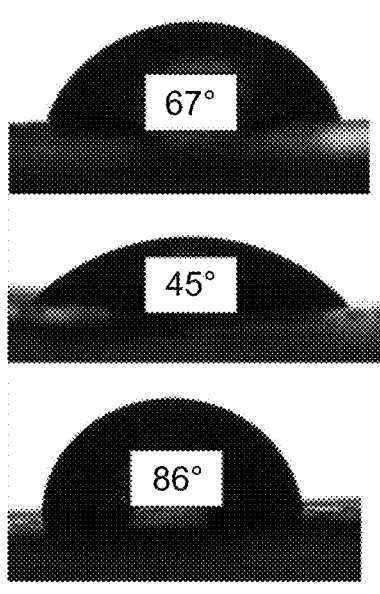
FIG. 13C shows the water contact angles of the fouled RO membranes cleaned with the DI water, PEHA solution at pH 9.4 and pH 8.0, according to certain embodiments.

FIG. 13C also shows the average contact angle values and droplet images after cleaning with PEHA at pH 8 and 9.4. Interestingly, the membrane cleaned at pH 8 has a higher CA (~83°) than even the sample flushed with DI alone (~73°). This, combined with the result of negative flux recovery (FIG. 13A), points to different phenomena occurring on the membrane surface. On the other hand, cleaning at pH 9.4 is as effective as cleaning at pH 11 in that the wetting behavior of the original membrane is restored (~45°).

Figure 14A:
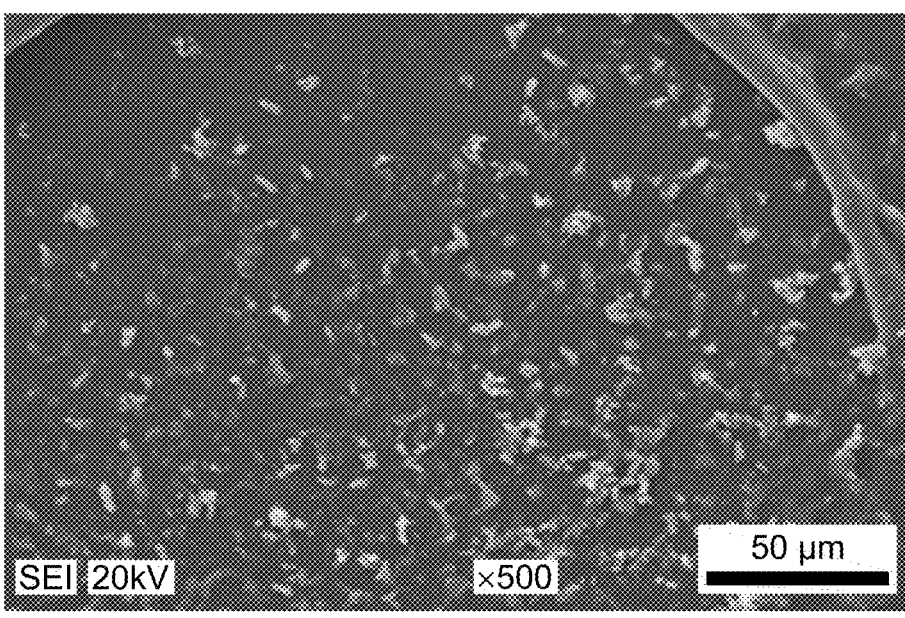
FIG. 14A shows a SEM image of the fouled RO membrane cleaned with 2.5 g/L PEHA solution at pH 8.0 at a scale bar of 50 μm, according to certain embodiments.
Figure 14B:
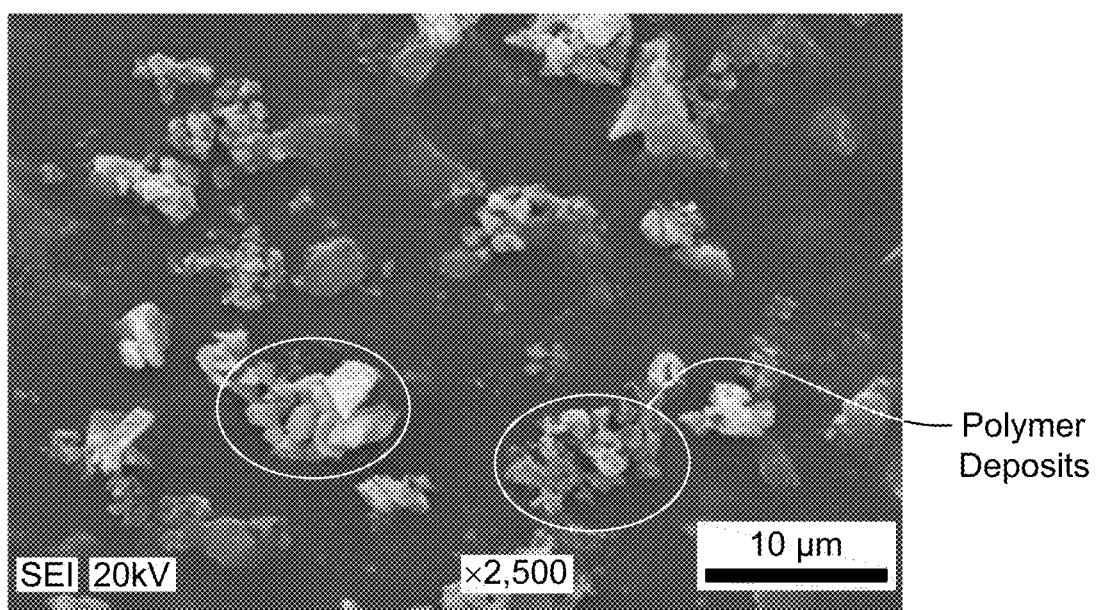
FIG. 14B shows the SEM image of the fouled RO membrane cleaned with 2.5 g/L PEHA solution at pH 8.0 at a scale bar of 10 μm, according to certain embodiments.
Figure 14C:
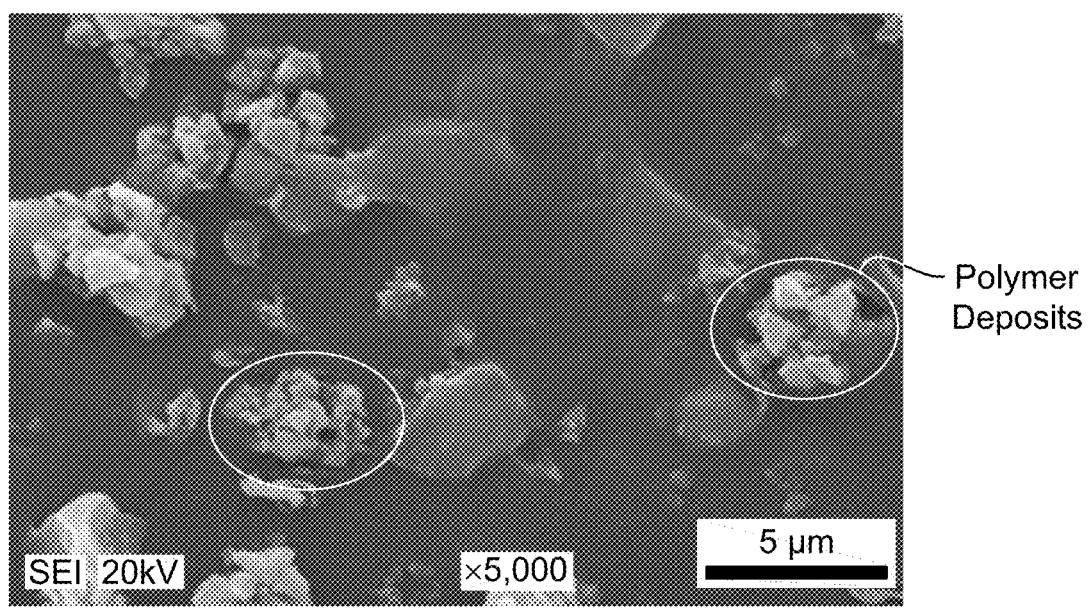
FIG. 14C shows the SEM image of the fouled RO membrane cleaned with 2.5 g/L PEHA solution at pH 8.0 at a scale bar of 5 μm, according to certain embodiments.
Figure 14D:
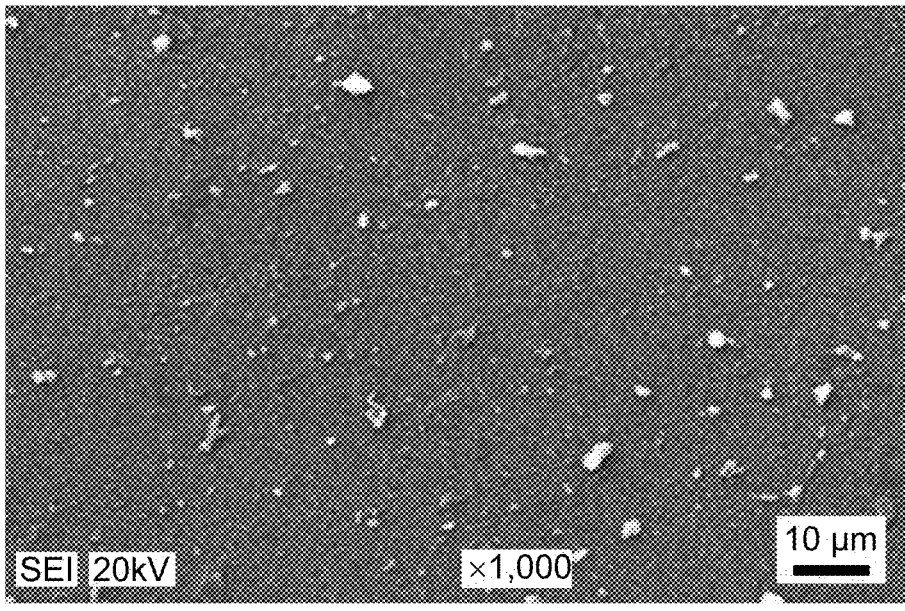
FIG. 14D shows a SEM image of the fouled RO membrane cleaned with 2.5 g/L PEHA solution at pH 9.5 at a scale bar of 10 μm, according to certain embodiments.
Figure 14E:
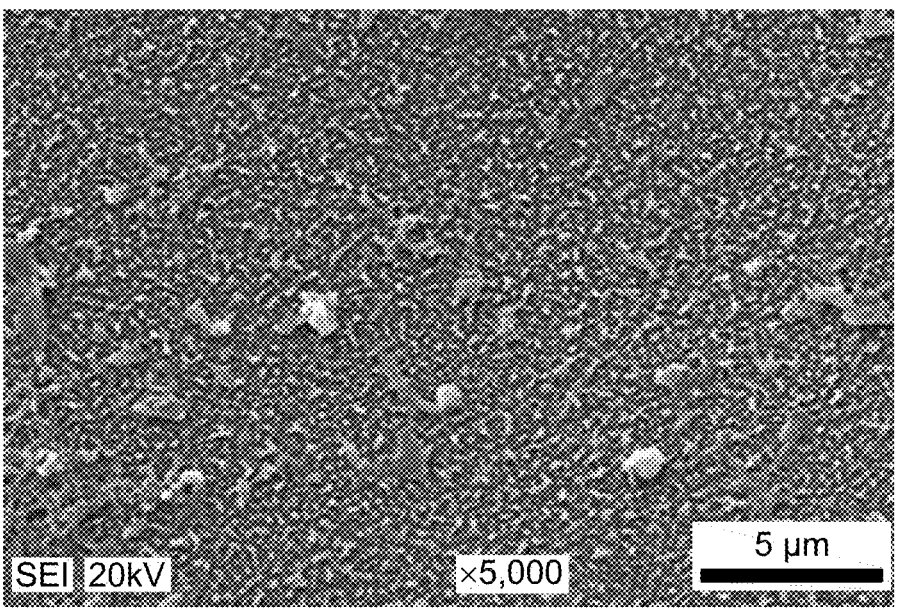
FIG. 14E shows the SEM image of the fouled RO membrane cleaned with 2.5 g/L PEHA solution at pH 9.5 at a scale bar of 5 μm, according to certain embodiments.
Figure 14F:
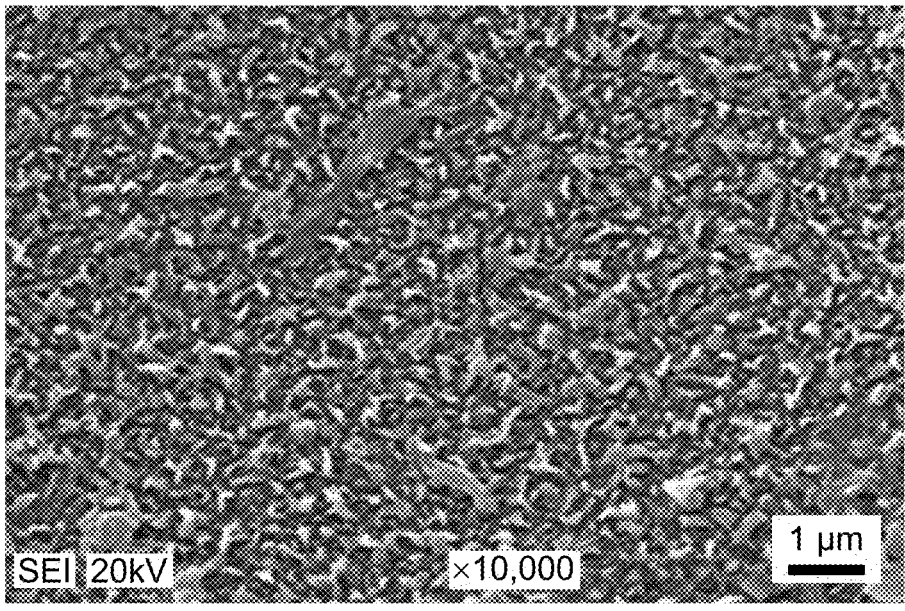
FIG. 14F shows the SEM image of the fouled RO membrane cleaned with 2.5 g/L PEHA solution at pH 9.5 at a scale bar of 1 μm, according to certain embodiments.
Figure 14G:
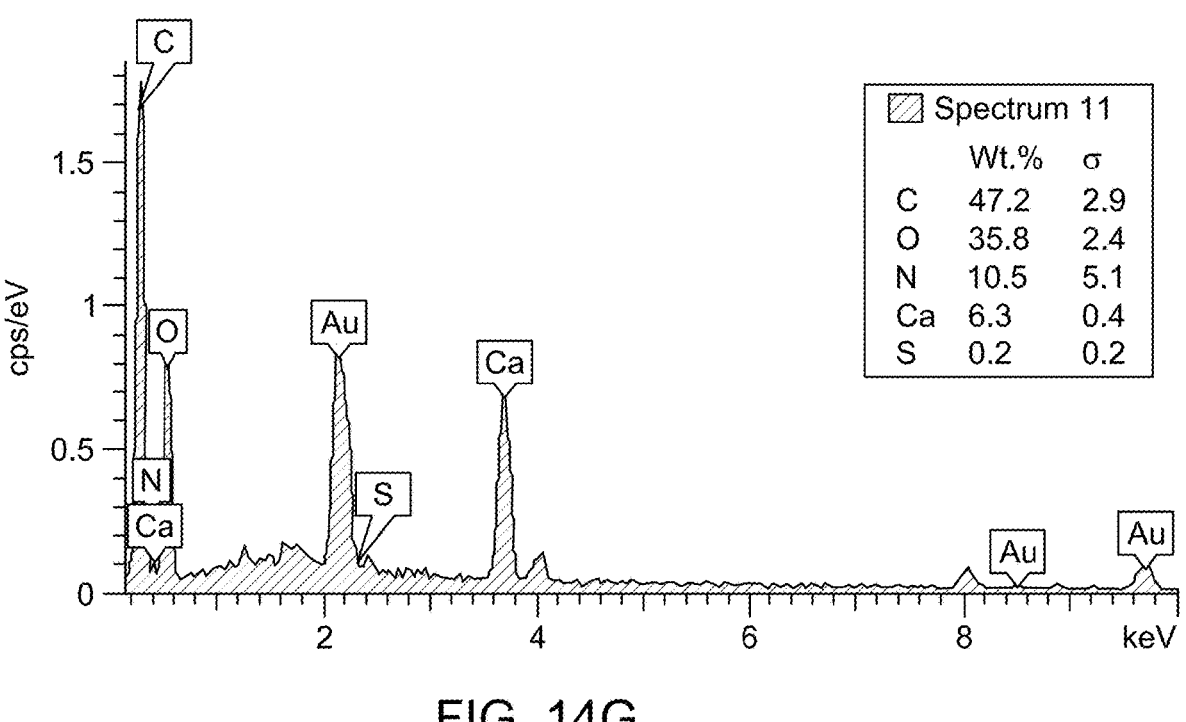
FIG. 14G shows an EDX spectrum of the fouled RO membrane cleaned with 2.5 g/L solution PEHA at pH 8.0, according to certain embodiments.
Figure 14H:
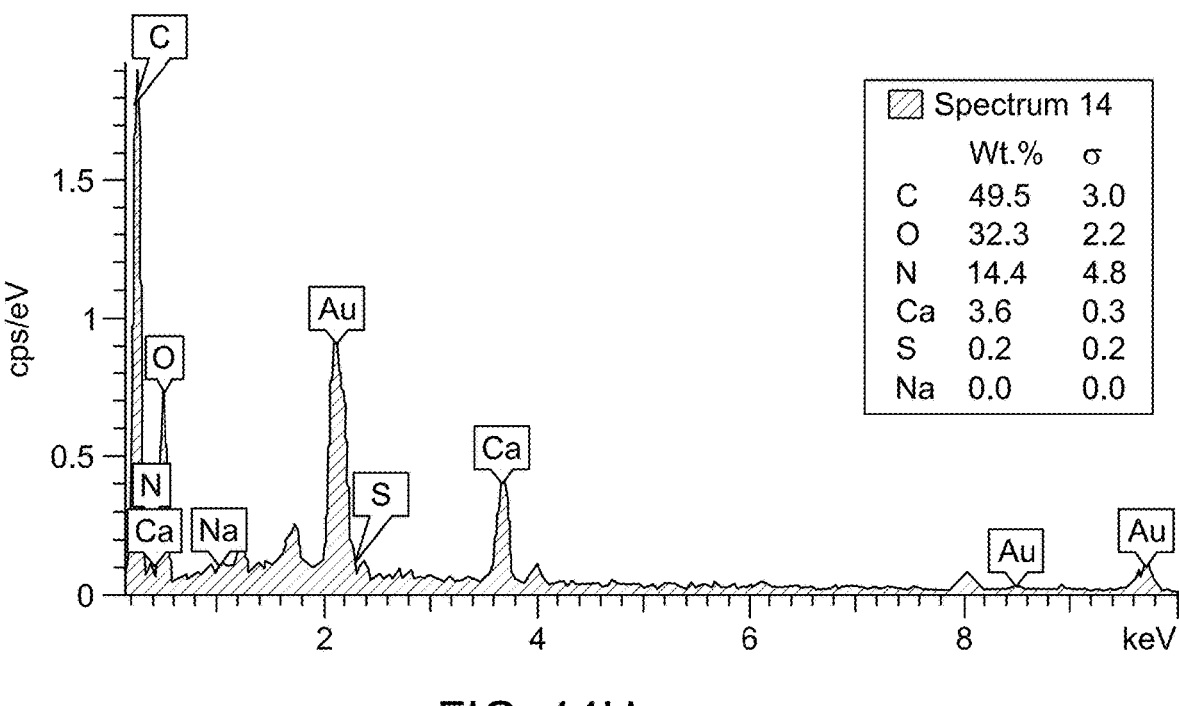
FIG. 14H shows the EDX spectrum of the fouled RO membrane flushed with DI water at pH 8.0, according to certain embodiments.
Figure 14I:
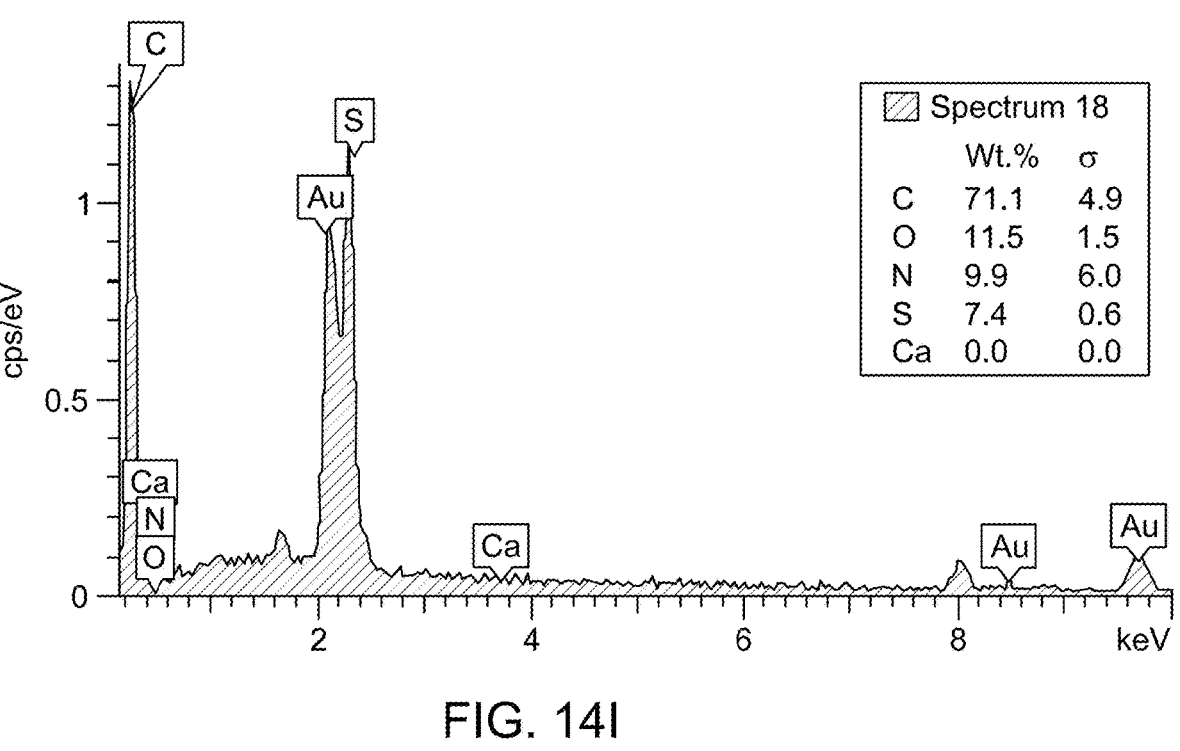
FIG. 14I shows the EDX spectrum of the fouled RO membrane cleaned with 2.5 g/L PEHA solution at pH 9.5, according to certain embodiments.
Figure 14J:
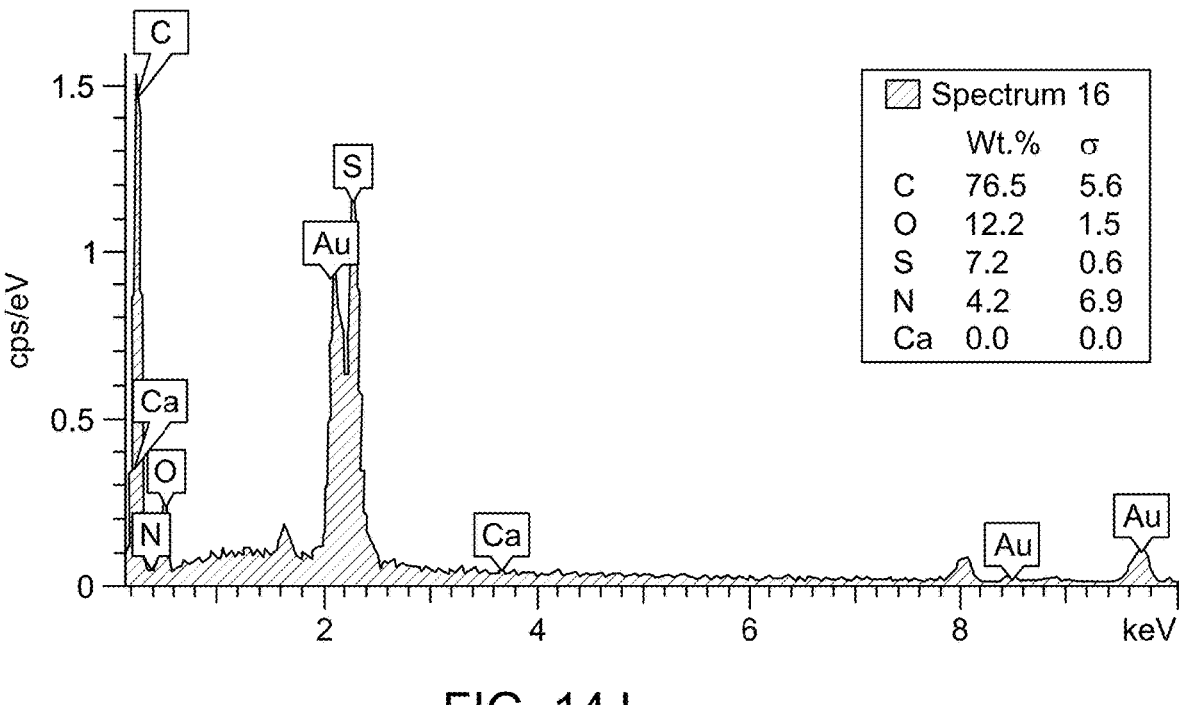
FIG. 14J shows the EDX spectrum of the fouled RO membrane flushed with DI water at pH 9.5, according to certain embodiments.

FIGS. 14A-14F shows SEM images of the membranes after cleaning with PEHA at pH of 8 and 9.5 respectively. The membrane cleaned at pH 8 exhibits a very different morphology from the other samples with white deposits on the surface. A closer examination shows the presence of clusters/agglomerates of these particles with the fouling layer undisturbed (FIGS. 14A-14C). The findings from the contact angle earlier (FIG. 13C) and EDX analysis later on (FIGS. 14G-14J) indicate these deposits to be the amphiphilic polymer trying to reassemble. In contrast, cleaning at pH 9.5 appears to be very effective with PA morphology clearly visible and only small foulant pieces are seen.

EDX analysis was also performed on the samples cleaned with PEHA solution at two different pH values: 8 and 9.5. FIGS. 14G-14J shows the results of this analysis. For the membrane cleaned at a pH of 8, the C:O ratio is between 1.3 and 1.5, only slightly higher than the fouled membrane flushed with DI alone. Another major observation is the unusually high N content (10-15%), which can be ascribed to the oligoethyleneamine groups of the polymer. This explains the origin of white deposits in earlier SEM images (FIGS. 14A-14C), On the other hand, the membrane cleaned at a pH of 9.5 exhibits a surface chemistry very near to that of the pristine one. The C:O ratio is of the order 7:1 and S and N are present in decent amounts.

Figure 15A:
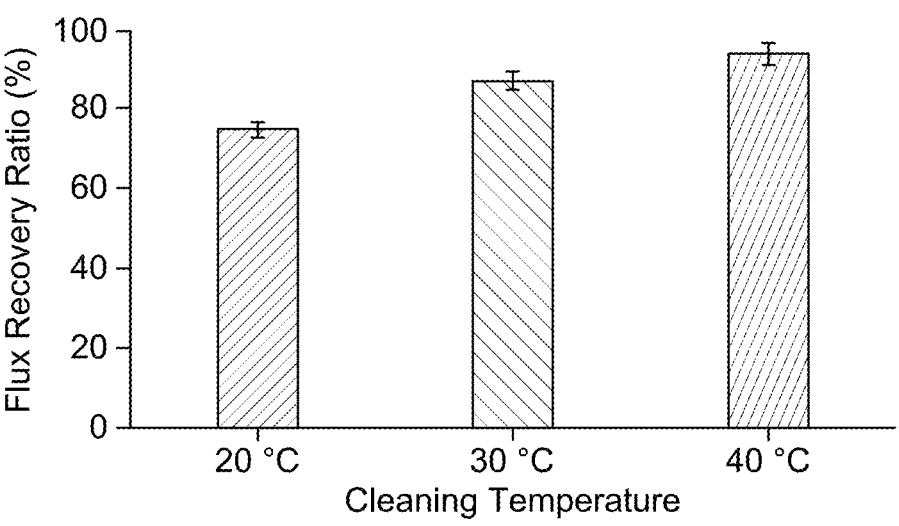
FIG. 15A is a bar graph showing the effect of cleaning temperature on flux recovery after cleaning the fouled RO membrane with 2.5 g/L PEHA solution at a pH 9.5, according to certain embodiments.
Figure 15B:
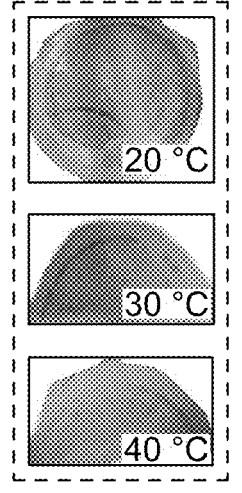
FIG. 15B shows the images of the fouled RO membrane cleaned with 2.5 g/L PEHA solution at a pH 9.5 at different temperatures (20° C., 30° C., and 40° C.), according to certain embodiments.
Figure 15C:
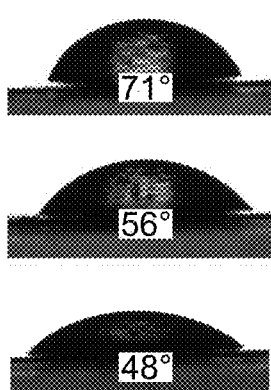
FIG. 15C are the images showing water contact angle of the fouled RO membrane after cleaning it with 2.5 g/L PEHA solution at a pH 9.5 and at different temperatures (20° C., 30° C., 40° C.), according to certain embodiments.

The temperature of the cleaning agent is important as it influences the various interactions taking place between the functional groups in the foulant and the cleaning agent. FIGS. 15A-15C shows the flux recovery and the CA values for the membranes cleaned with 2.5 g/L PEHA at temperatures of 20, 30 and 40° C. The lowest FRR (~75%) is observed when the fouled membrane is cleaned with PEHA at a temperature of 20° C. A continuous albeit thin fouling layer is visible on the membrane surface, also verified by the high value of contact angle (~71°) similar to the findings with TETA cleaning (FIG. 8C). Increasing the cleaning temperature to 30° C. results in a more effective cleaning: FRR~87%, CA~56% and a relatively clean surface with the foulant present as small patches. A further increase in the temperature to 40° C. nearly restores the original membrane permeability (FRR~94%) as well as surface hydrophilicity (CA~48°).

The above trend can be explained by the rate dependence of the phenomena occurring during cleaning, with temperature. Increasing the temperature of the cleaning solution most likely enhances the chemical reaction and mass transfer during the cleaning process. Ang and co-workers investigated the effect of cleaning temperature (20-40° C.) on the cleaning efficiency of fouled membranes [Ang, W. S., et al. J Memb Sci 272, (2006) 198-210, which is incorporated herein by reference in its entirety]. They found that both the chemical reaction efficiency of EDTA with foulants and the diffusive transport of foulants were heightened with increased temperature, resulting in an enhanced cleaning efficiency. Similarly, Nilsson et al. reported that both acid cleaning and alkaline cleaning at a temperature of 40° C. increased water permeability of NF membrane [Nilsson, M., et al. Sep Purif Technol 62, (2008) 717-726, which is incorporated herein by reference in its entirety]. Furthermore, the higher temperature itself can loosen the fouling layer and reduce the viscosity of the cleaning solution, thus accelerating the accessibility of the cleaning agents

[Sohrabi, M. R., et al. Desalination 267, (2011) 93-100, which is incorporated herein by reference in its entirety].

Comb-shaped amphiphilic polymers composed of a polymaleic anhydride backbone and grafted with oligoethyleneamine side chains with varying amine content were synthesized. The polymeric solutions were used to clean RO membranes fouled by a model organic foulant, sodium alginate. The PEHA grafted polymer was found to be most effective in foulant removal and remediation of membrane performance with a flux recovery >90%. The high-efficiency cleaning of the PEHA polymer was maintained at a pH of 9.5, corresponding to cleaning in conditions milder than current industrial systems. However, a near-neutral pH of ~8.0, was observed to be counter-effective resulting in a negative flux recovery. The results from membrane characterization were in good agreement with the above findings and trends in flux recovery. SEM images revealed the original polyamide morphology and only sporadic presence of foulants on the samples cleaned with PEHA at pH of 9.5 and 11. whereas, a continuous fouling layer was visible on membranes cleaned with TETA. Results of EDX analysis showed that the C:O ratio for the efficiently cleaned membranes was similar to the pristine and the $Ca^{2+}$ content was lower than the fouled ones. Similarly, contact angle values were a direct indicator of cleaning efficacy, with well-cleaned surfaces exhibiting values similar to the pristine membrane, whilst the poorly-cleaned ones showed similar wettability to fouled membranes.

To summarize, the present disclosure presents a novel approach for the preparation of green and benign cleaning agents which are highly effective in mild cleaning conditions. This provides a possible alternative to the current combination of cleaning chemicals used in harsh conditions of pH resulting in membrane attack and shortening of their lifetime.

Numerous modifications and variations of the present disclosure are possible in light of the above teachings. It is therefore to be understood that within the scope of the appended claims, the invention may be practiced otherwise than as specifically described herein.

The invention claimed is:

1. A method of cleaning a fouled reverse osmosis membrane, comprising:
   dissolving a comb-shaped polymer and a base in water to form a solution;
   contacting the fouled reverse osmosis membrane with the solution to produce a cleaned reverse osmosis membrane,
   wherein the comb-shaped polymer comprises reacted units of poly(isobutylene-alt-maleic anhydride) and an oligoethylene amine,
   wherein the oligoethylene amine is one or more selected from the group consisting of triethylenetetramine, tetraethylene pentaamine, and pentaethylenehexamine, and
   wherein the fouled reverse osmosis membrane comprises a reverse osmosis membrane and a foulant.

2. The method of claim 1, wherein the concentration of the comb-shaped polymer in the solution is 2-3 $gL^{-1}$.

3. The method of claim 1, wherein the foulant comprises one or more polysaccharides.

4. The method of claim 1, wherein the pH of the solution is 9-12.

5. The method of claim 1, wherein the solution is contacted with the fouled reverse osmosis membrane for 40-60 hours.

6. The method of claim 1, wherein the solution is contacted with the fouled reverse osmosis membrane at a temperature of 30-50° C.

7. The method of claim 1, wherein the cleaned reverse osmosis membrane has a flux recovery of 55-95% compared to the fouled reverse osmosis membrane before the contacting.

8. The method of claim 1, wherein the cleaned reverse osmosis membrane has a $Ca^{2+}$ presence of less than 2 wt. %.

9. The method of claim 1, wherein the cleaned reverse osmosis membrane has a carbon to oxygen ratio of 1.5-5 to 1.

10. The method of claim 1, wherein the cleaned reverse osmosis membrane has a sulfur content of 3-10 wt. %.

11. The method of claim 1, wherein the cleaned reverse osmosis membrane has an isoelectric point of 3-4.

12. The method of claim 1, wherein the reverse osmosis membrane is a ceramic membrane.

13. The method of claim 1, further comprising;

mixing poly(isobutylene-alt-maleic anhydride) (PIMA) and a first organic solvent to form a solution;

mixing an oligoethylene amine and a second organic solvent to form a mixture;

adding the solution to the mixture and stirring to form the comb-shaped polymer, wherein the oligoethylene amine is one or more selected from the group consisting of triethylenetetramine, tetraethylene pentaamine, and pentaethylenehexamine.

14. The method of claim 12, wherein the first organic solvent is dimethyl sulfoxide.

15. The method of claim 12, wherein the second organic solvent is dimethyl sulfoxide.

16. The method of claim 12, wherein the solution and the mixture are stirred at a temperature of 40-80° C.

17. The method of claim 12, wherein the solution and the mixture are stirred for 60-90 hours.

18. The method of claim 12, wherein the molar ratio of the oligoethylene amine to the PIMA is 18-22 to 1.

19. The method of claim 12, wherein the degree of pendent oligoethylene amine conjugation is 90-100%.

* * * * *